United States Patent
Smith

(10) Patent No.: US 7,589,958 B2
(45) Date of Patent: Sep. 15, 2009

(54) MOUNTABLE ELECTRONIC DEVICE HAVING AN INPUT DEVICE

(75) Inventor: Renato L. Smith, Chicago, IL (US)

(73) Assignee: Originatic LLC, Chicago, IL (US)

( * ) Notice: Subject to any disclaimer, the term of this patent is extended or adjusted under 35 U.S.C. 154(b) by 0 days.

(21) Appl. No.: 11/509,392

(22) Filed: Aug. 24, 2006

(65) Prior Publication Data

US 2007/0047193 A1  Mar. 1, 2007

Related U.S. Application Data

(63) Continuation of application No. 10/795,684, filed on Mar. 8, 2004, now Pat. No. 7,158,373.

(51) Int. Cl.
H05K 7/14 (2006.01)
(52) U.S. Cl. .............................. 361/679.02; 361/679.21
(58) Field of Classification Search ................ 361/680, 361/683, 679.21
See application file for complete search history.

(56) References Cited

U.S. PATENT DOCUMENTS

| | | | |
|---|---|---|---|
| 3,980,869 A | 9/1976 | Lombardino et al. | |
| 4,281,874 A | 8/1981 | Iwans et al. | |
| 4,718,740 A | 1/1988 | Cox | |
| 4,922,980 A | 5/1990 | Parker | |
| 4,982,618 A | 1/1991 | Culver | |
| 5,055,839 A | * 10/1991 | Davis et al. | 341/22 |
| 5,168,423 A | 12/1992 | Ohgami et al. | |
| 5,229,757 A | 7/1993 | Takamiya et al. | |
| 5,262,762 A | 11/1993 | Westover et al. | |
| 5,268,817 A | 12/1993 | Miyagawa et al. | |
| 5,351,066 A | 9/1994 | Rucker et al. | |
| 5,438,331 A | 8/1995 | Gilligan et al. | |
| 5,615,081 A | 3/1997 | Ma | |
| 5,629,832 A | 5/1997 | Sellers | |
| 5,657,370 A | * 8/1997 | Tsugane et al. | 455/566 |
| 5,673,169 A | * 9/1997 | Wicks | 361/680 |
| 5,800,085 A | 9/1998 | Lee | |
| 5,944,432 A | 8/1999 | Richardson | |
| 5,996,956 A | * 12/1999 | Shawver | 248/309.1 |
| 6,095,702 A | 8/2000 | Garbacik | |
| 6,121,958 A | * 9/2000 | Clark et al. | 345/168 |
| 6,189,849 B1 | 2/2001 | Sweere et al. | |
| 6,256,018 B1 | 7/2001 | Zarek | |

(Continued)

FOREIGN PATENT DOCUMENTS

DE  19909398 A1  9/2000

(Continued)

OTHER PUBLICATIONS

"Info Appliance Offers Nice Touches, but It's Costly, Has Limitations" by Walter S. Mossberg, The Wall Street Journal, Personal Technology, Column B2, Jul. 21, 2005.

(Continued)

Primary Examiner—Jayprakash N Gandhi
Assistant Examiner—Ingrid Wright

(57) ABSTRACT

An electronic device comprising a housing which is mountable to a support, such as a wall or upstanding support structure. The electronic device has a display device and an input device. This electronic device provides enhanced convenience and operational functionality.

27 Claims, 23 Drawing Sheets

U.S. PATENT DOCUMENTS

| | | | |
|---|---|---|---|
| 6,381,132 B1 | 4/2002 | Nakamoto | |
| 6,411,502 B1 | 6/2002 | Burrell | |
| 6,414,840 B2 | 7/2002 | Suzuki | |
| 6,480,372 B1 | 11/2002 | Vong et al. | |
| 6,587,094 B2 * | 7/2003 | Anderson | 345/168 |
| 6,621,691 B2 | 9/2003 | Howell | |
| 6,628,508 B2 | 9/2003 | Lieu et al. | |
| 6,628,510 B2 | 9/2003 | Genin | |
| 6,667,759 B2 * | 12/2003 | Gerszberg et al. | 348/14.01 |
| 6,680,843 B2 | 1/2004 | Farrow et al. | |
| 6,688,518 B1 | 2/2004 | Valencia et al. | |
| 6,700,773 B1 * | 3/2004 | Adriaansen et al. | 361/680 |
| 6,700,774 B2 | 3/2004 | Chien et al. | |
| 6,791,826 B2 | 9/2004 | Ho | |
| 6,795,304 B1 | 9/2004 | Lam | |
| 6,909,408 B2 | 6/2005 | Matko et al. | |
| 7,004,430 B2 | 2/2006 | Weekly | |
| 2002/0070922 A1 | 6/2002 | Zarek | |
| 2002/0190172 A1 | 12/2002 | Oddsen, Jr. | |
| 2003/0184957 A1 | 10/2003 | Stahl et al. | |
| 2004/0149905 A1 | 8/2004 | Bowles et al. | |
| 2004/0208681 A1 | 10/2004 | Dechene | |
| 2004/0227733 A1 | 11/2004 | Fyke et al. | |
| 2005/0070324 A1 * | 3/2005 | Chadha | 455/550.1 |
| 2005/0139679 A1 | 6/2005 | Salvato | |
| 2005/0148395 A1 | 7/2005 | Kim et al. | |
| 2005/0195561 A1 | 9/2005 | Smith | |
| 2005/0243505 A1 | 11/2005 | Jackson, Jr. | |
| 2006/0098403 A1 | 5/2006 | Smith | |
| 2006/0208139 A1 | 9/2006 | Mossman | |
| 2007/0047193 A1 | 3/2007 | Smith | |
| 2007/0247800 A1 | 10/2007 | Smith et al. | |

FOREIGN PATENT DOCUMENTS

| | | |
|---|---|---|
| DE | 10314554 A1 | 10/2004 |
| JP | 4000620 | 1/1992 |

OTHER PUBLICATIONS

In-Vehicle Computer, Stargate Mobile [online]. [retrieved on Nov. 3, 2005]. Retrieved from the Internet: <http://www.stargatemobile.com/ASC.html>.

Saranow, Jennifer and Chon, Gina, *Coming Soon to Your Car*, The Wall Street Journal, p. D1 (Nov. 3, 2005), pp. 1-4.

PanelPC, Panel Industrial Systems, year 2002 [online]. [retrieved on Aug. 21, 2006]. Retrieved from the Internet; http://webarchive.org/web/20030902013810/www.panelpc.com/2002/.

Internet Archive Wayback Machine for www.datalux.com, dated Jan. 25, 2004, 2 pages [online]. [retrieved on Aug. 12, 2007]. Retrieved from the Internet: <http://web.archive.org/web/*http://www.datalux.com>.

Internet Archive Wayback Machine for www.flat-panel-mount.com, dated Jan. 21, 2004, 5 pages [online]. [retrieved on Aug. 12, 2007]. Retrieved from the Internet: <http://web.archive.org/web/*http://www.flat-panel-mount.com>.

Internet Archive Wayback Machine for www.issltd.co.uk, dated Feb. 7, 2004, 3 pages [online]. [retrieved on Aug. 12, 2007]. Retrieved from the Internet: <http://web.archive.org/web/*http://www.issltd.co.uk.com>.

Internet Archive Wayback Machine for www.infologixsys.com, dated Jan. 8, 2004, 3 pages [online]. [retrieved on Aug. 12, 2007]. Retrieved from the Internet: <http://web.archive.org/web/*http://www.infologixsys.com>.

Sony's All-in-One Desktop—Enlarged Product Image, by Bill Howard, PC Magazine, dated Nov. 8, 2002 [retrieved on Aug. 12, 2007]. Retrieved from the Internet: <http://www/pcmag.com/article2/0.4149.677305.00.asp>.

Beyond Digital Living—Press, Salton's Beyond ICEBOX FlipScreen Wins the Consumer Electronics Association Mark of Excellence Award, Seattle—Mar. 7, 2003, 2 pages [online]. [retrieved on Aug. 12, 2007]. Retrieved from the Internet: <http://www.beyondconnectedhome.com/aboutus/press/pr_030307.html>.

All-In-One Multimedia Powerhouse, Cnet [online]. [retrieved on or before Oct. 5, 2006]. Retrieved from the Internet: <http://www.cnet.com>.

Boldata LCD PC CP414 Series, Cnet [online]. [retrieved on or before Oct. 5, 2006]. Retrieved from the Internet: <http://www.cnet.com>.

I-One All-In-One LCD PC-TV, Cnet [online]. [retrieved on or before Oct. 5, 2006]. Retrieved from the Internet: <http://www.cnet.com>.

Sinocan All-In-One PC 2006, Cnet [online]. [retrieved on or before Oct. 5, 2006]. Retrieved from the Internet: <http://www.cnet.com>.

Tek Panel 320, Cnet [online]. [retrieved on or before Oct. 5, 2006]. Retrieved from the Internet: <http://www.cnet.com>.

Gateway's Media Center PC, Cnet, dated Jan. 7, 2004 [online]. [retrieved on or before Oct. 5, 2006]. Retrieved from the Internet: <http://www.cnet.com>.

Gateway Profile 6C, Cnet, dated Oct. 12, 2006 [online]. [retrieved on or before Oct. 5, 2006]. Retrieved from the Internet: <http://www.cnet.com>.

MPC's ClientPro Line, Cnet, dated Jul. 21, 2003 [online]. [retrieved on or before Oct. 5, 2006]. Retrieved from the Internet: <http://www.cnet.com>.

Pelham Sloan PS1500, Cnet, dated Sep. 11, 2003 [online]. [retrieved on or before Oct. 5, 2006]. Retrieved from the Internet: <http://www.cnet.com>.

Search Report, WO, Nov. 12, 2008, Originatic LLC.

SuperLogics, SL-PPC-120 [online]. [retrieved on Aug. 2, 2006]. Retrieved from the Internet: <http://www.superlogics.com/industrial-computers/panel-pc-computer/SL-PPC-120/35-1900.htm.

"Sony's All-in-One Desktop" by Bill Howard, PC Magazine, dated Nov. 8, 2002 [retrieved on Jul. 1, 2007]. Retrieved from the Internet: <http://www/pcmag.com/article2/0,4149,677305,00.asp>.

Description of Medical Computers, compiled by Originatic LLC, Jan. 8, 2007, pp. 1-16.

Beyond Icebox Flipscreen '04 Kitchen Entertainment, eSalton [online]. [retrieved on Aug. 16, 2006]. Retrieved from the Internet: <http://www.esalton.com/control/product>.

* cited by examiner

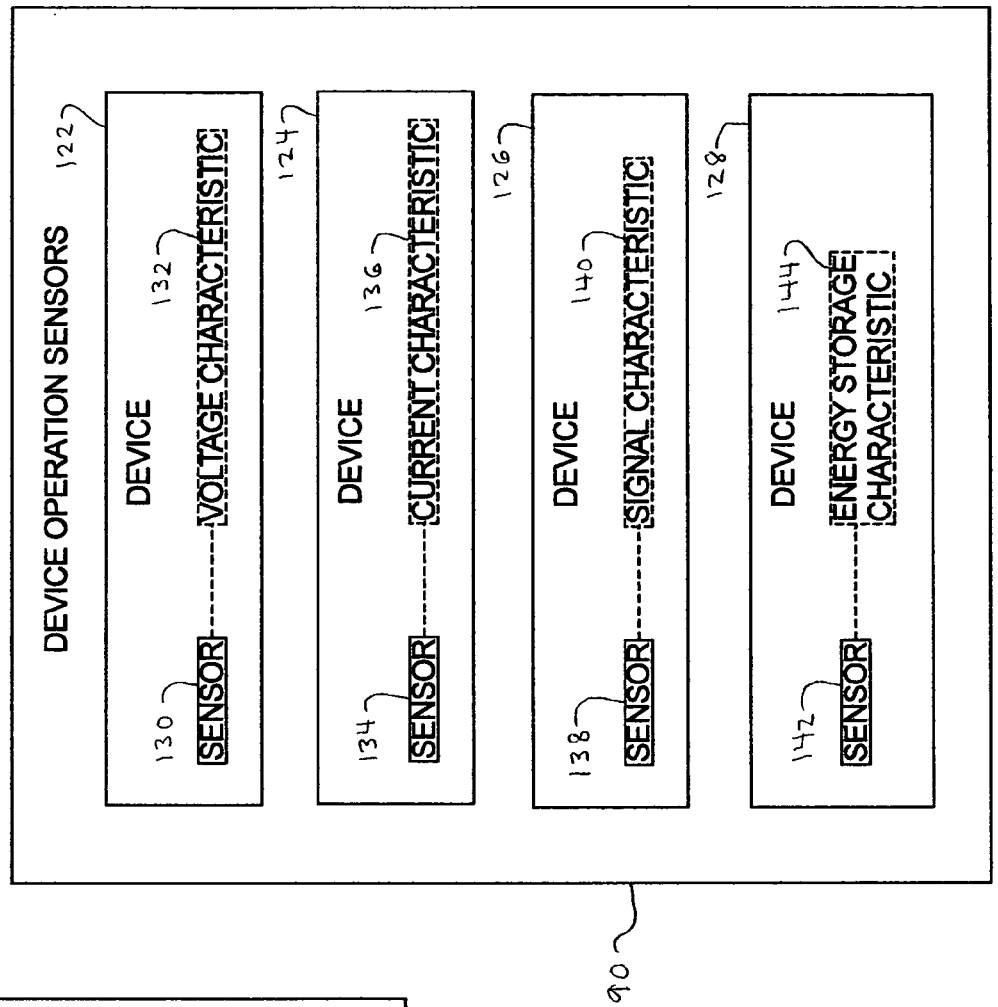
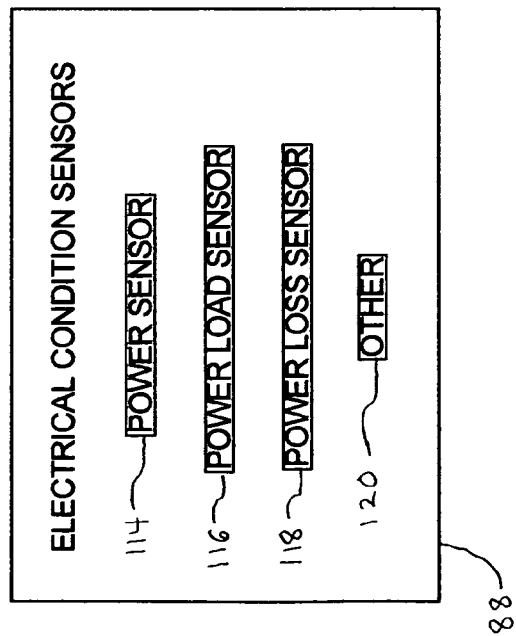

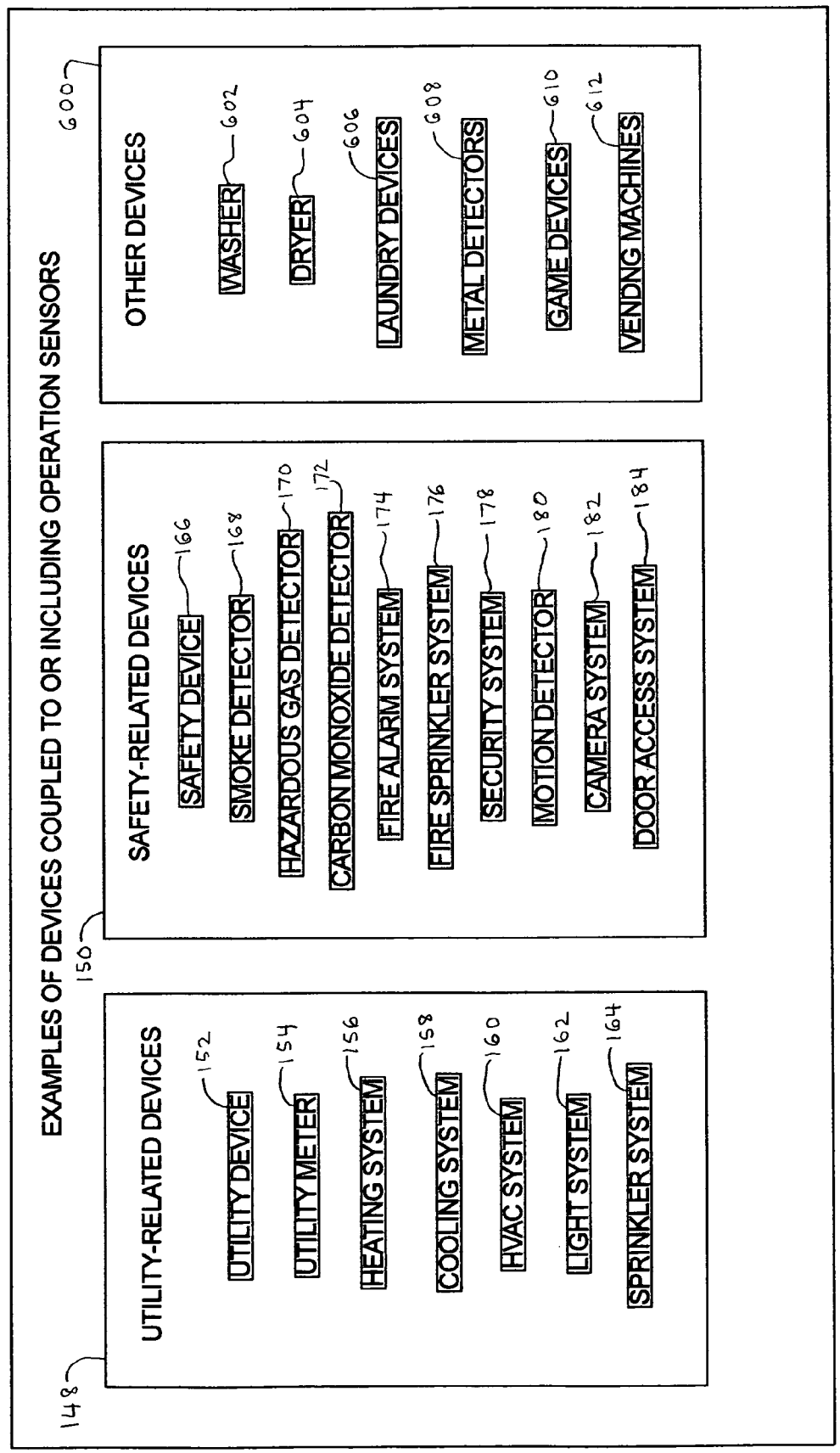

MOUNTABLE ELECTRONIC DEVICE HAVING AN INPUT DEVICE

PRIORITY CLAIM

This application is a continuation of, and claims the benefit and priority of, U.S. patent application Ser. No. 10/795,684, filed on Mar. 8, 2004, now U.S. Pat. No. 7,158,373 entitled "Electronic Device Having A Keyboard Rotatable About An Axis."

CROSS REFERENCE TO RELATED APPLICATIONS

This application is related to the following commonly-owned co-pending patent applications: U.S. patent application Ser. No. 11/315,830, filed on Dec. 22, 2005, entitled "Electronic Device Having A Movable Input Assembly With Multiple Input Sides;" U.S. patent application Ser. No. 11/787,999, filed on Apr. 17, 2007, entitled "Assembly Having A Main Unit And A Mounting Unit;" U.S. patent application Ser. No. 29/285,998, filed on Apr. 17, 2007, entitled "Electronic Device;" U.S. patent application Ser. No. 29/294,304, filed on Jan. 3, 2008, entitled "Electronic Device;" U.S. patent application Ser. No. 29/294,642, filed on Jan. 18, 2008, entitled "Electronic Device;" U.S. patent application Ser. No. 12/074,811, filed on Mar. 6, 2008, entitled "Advertisement System And Method Involving A Mountable Electronic Device Electronic Device Having An Input Device;" and U.S. patent application Ser. No. 29,307,997, filed on May 22, 2008, entitled "Electronic Device."

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

Many of the challenges in the facility management industry relate to information, that is, the flow of information involving facility conditions and facility users. As described below, the known technology fails to adequately maintain or facilitate the flow of this information. This can result in a decrease in the quality and safety of the facility as well as a decline in the profitability of facility operations.

Information Related to Facility Conditions

Most facilities require regular maintenance and periodic repairs in order to maintain an adequate level of quality and safety. In many cases, if the manager discovers a defect early enough, the manager can have the repair made before significant collateral damage occurs to the facility. For many facilities, due to the size of the building, limitations on the manager's resources or the type of commercial activity, there may be a significant delay before the manager receives notice of a defect. For example, in an apartment building, the manager's access to the apartments is restricted. If the tenant is unaware of or otherwise fails to report a water leak, the manager may not learn of the leak until the leak causes costly water damage to another apartment.

Therefore, it is advantageous to acquire certain information about facility defects independent of the facility users, for example, by using sensor technology. The known facility management software, however, does not accommodate sensor technology. Facility management software has come to be a valuable tool used today by facility owners and facility management companies to operate their businesses. The conventional facility management software enables managers, whether employed by a facility owner or management company, to track, store and access information related to the facility, residents, accounting, repairs and contractors. Certain types of facility management software are now accessible to managers over the Internet through application service providers.

Despite this advancement, this conventional software has failed to evolve with the relatively recent use of sensor technology in buildings and other facilities. The use of sensors to detect defects in facilities can significantly enhance facility operations. Different types of sensors have been used to monitor characteristics in buildings such as temperature, light and leaks. Sensor software has also been developed to enable personal computers to process and present the sensor data to end users.

However, as stated earlier, the known facility management software does not have the functionality to accommodate the sensor technology. Therefore, in order to manage a facility utilizing sensor technology, the manager must use two disintegrated software systems—the facility management software and the sensor software. For example, the manager must use the facility management system in order to track past due rent and defects phoned-in by tenants. Then the manager must switch software programs and use the sensor software in order to track defects reported by the sensors. Next, the manager must transfer these defect reports to the facility management system.

Using two discrete systems in this fashion has several disadvantages. Information can be lost in the transfer of data from the sensor system to the facility management system. In addition, the facility owner or management company must incur the labor cost associated with operating and maintaining both systems and transferring the sensor data to the property management system. This labor cost can be relatively high for larger facilities. Furthermore, because the sensor system is not the main system used by the manager, there is the risk that the manager will not check the sensor system as often as necessary to receive defect reports from the sensors in a timely fashion.

Information Related to Facility Users

Another disadvantage of the known technology relates to the existing method of communication between the manager and the facility users. Currently, managers send information to facility users by: (a) sending a letter to the facility user by regular mail; (b) posting a sign on the lobby bulletin board; or (c) telephoning the facility user. Facility users typically provide information to the manager by phone, but sometimes facility users send notices to the manager by regular mail, facsimile or email.

One disadvantage with this method is that tenants sometimes misplace mailings or overlook bulletin board postings. As a result, managers may have to reschedule appointments, and the tenants may lose important information. This can result in increased administrative costs, lost income and increased exposure to liability for personal injury and other claims.

Another disadvantage with this method is that tenants often find it too inconvenient or too time consuming to mail or fax a notice to the manager. Many tenants also find it too inconvenient or time consuming to email a notice to the manager using a conventional computer. Part of the reason for this is that the conventional personal computer is designed to rest on a computer desk or table. Although laptop computers are mobile, they too are designed to rest on a substantially horizontal surface. Neither of these conventional computers are designed to be mounted to an upright surface, such as the wall of a kitchen or hallway.

For all of these reasons, tenants typically provide the manager with a notice orally, over the phone. Consequently, neither the manager nor the tenant has a written record of the notice. This can lead to disputes regarding the exact content of the notice which, in turn, can lead to increased administrative costs and tenant dissatisfaction.

There is thus a need to overcome all of the disadvantages described above. There is also a need to provide an improved and more efficient facility management computer system in order to enhance the management, operation and use of facilities. Furthermore, there is a need to provide a computer device to facilitate communications and transactions between facility managers and facility users. In addition, there is a need to provide a computer device that is relatively highly convenient to use in facilities, homes, vehicles and other areas.

SUMMARY OF THE INVENTION

The present invention relates to a facility management computer system, and the present invention also relates to a wall-mountable computer for use in apartments, houses and other facilities and areas.

Facility Management Computer System

The computer system, in one embodiment, is used to operate a facility management website. Managers, people who are involved in overseeing, supervising, administering or otherwise conducting facility management activities, can use the website as a tool to conduct their facility management activities. The computer system provides the website with sensor functionality in addition to other facility management functionality.

In one embodiment, the facility owner or manager can install a sensor kit in each unit of a facility, such as an apartment unit. The facility owner or manager can also install sensor kits in the public areas of the facility. Each sensor kit includes a plurality of sensors and a wall-mounted gateway. The sensors transmit data to the gateways when certain events occur, such as a water leak, a low battery for a smoke detector, a broken window, a power outage, insufficient lighting, or any other condition detected by the sensors. The gateways transmit this sensor data to a server operated by an application service provider. The computer system of the present invention directs the server to make the sensor data available at the website.

At the same time, the computer system enables the manager of the facility to use the website as a fully functional facility management system. Accordingly, the manager can manually enter, store, organize and retrieve property management data at the website. The sensor-generated data is integrated with the manually input data. Therefore, the computer system enables the facility manager to access information and reports which incorporate sensor data. This assists the facility managers in increasing the efficiency of operating the facility, minimizing loss and damage to the facility and maximizing profits.

Wall-Mountable Computer

In one embodiment, the computer of the present invention has a relatively flat, slim configured housing with a wall mount or wall securing member. This securing member enables the user to attach the computer to a wall or any other suitable upstanding structure. The keyboard is built into the housing of the computer. A user can attach the computer to a kitchen wall, for example, by using one or more screws or other suitable fasteners. Then, the user can connect the computer to a power source and to the Internet. In one embodiment, the computer has a back-up battery power source for operation during power outages.

Because the computer can be attached to a wall and fully operated while on the wall, the computer is relatively highly convenient for many tasks. If the computer is attached to a kitchen wall, for example, the user can use suitable software to display a calendar, task list, personal phone directory and email center. Therefore, the user can conveniently schedule and record appointments while working in the kitchen. Many of the user's household tasks can be managed and viewed at the computer on the kitchen wall. Also, the user can use the keyboard to send email messages to others, to obtain information over the Internet and to conduct word processing and other computer tasks. If used in conjunction with a personal digital assistant (PDA), such as a palm device, the computer can be used by the entire family to stay up-to-date on one another's scheduling, appointments and obligations.

In one embodiment, the keyboard is partially rotatable about an axis. To use the keyboard, the user rotates the keyboard outward, and to close the keyboard, the user rotates the keyboard inward. In the closed position, the keyboard is less likely to be damaged by people or objects passing by the computer. In this sense, the housing functions as a guard having guard walls which protect the keyboard. Because the keyboard is built into the housing, even when the keyboard is in the open position, the housing provides a level of protection against damage.

In another embodiment, the housing of the computer defines an opening located below the screen. The keyboard is located on a lower portion of the housing below this opening. Here, the opening functions as a space for the user's hands when typing on the keyboard. In this embodiment, the keyboard may be non-movably fixed to the housing or adjustable positioned on the housing.

The wall-mountable computer of the present invention brings the functionality of the personal office computer to those who are carrying out household activities on a regular basis. The integrated keyboard enables the compute to have a relatively thin profile which, in turn, safeguards the computer and enhances the aesthetics of the computer. This type of computer provides a relatively high degree of convenience to computer users.

It is therefore an object of the present invention to provide a facility management computer system operable for receiving data over a network generated by users and sensors.

Another object of the present invention is to facilitate the monitoring of facility conditions from locations away from where the conditions are observed.

Yet another object of the present invention is to decrease the time associated with discovering undesirable conditions at facilities.

Still another object of the present invention is to decrease damage caused to facilities by water leaks, facility deterioration and other facility conditions.

Another object of the present invention is to simplify the process of tracking service data of a facility where that data includes data derived from artificial intelligence and data derived from human intelligence.

Yet another object of the present invention is to increase the profit associated with operating or managing a facility.

Still another object of the present invention is to increase facility operation efficiency.

Another object of the present invention is to reduce the cost of managing a facility.

Yet another object of the present invention is to facilitate the process of managing a facility.

Still another object of the present invention is to lower facility insurance premiums or encourage facility insurance discounts.

Another object of the present invention is to increase satisfaction from tenants and other facility users.

Yet another object of the present invention is to provide a wall-mountable computer having an integrated keyboard.

Another object of the present invention is to encourage, increase and facilitate the use of computers in the midst of household activities.

Still another object of the present invention is to guard computers and computer keyboards against damage.

Yet another object of the present invention is to decrease the thickness of a computer having a keyboard which is adapted to be mounted to a wall or other upstanding member.

Additional features and advantages of the present invention are described in, and will be apparent from, the following Detailed Description of the Invention and the figures.

BRIEF DESCRIPTION OF THE FIGURES

FIG. 6 is a schematic block diagram illustrating the electrical condition sensors in one embodiment of the present invention.

FIG. 7 is a schematic block diagram illustrating the device operation sensors in one embodiment of the present invention.

FIG. 8 is a schematic block diagram illustrating examples of devices coupled to or including operation sensors in one embodiment of the present invention.

DETAILED DESCRIPTION OF THE INVENTION

I. Facility Management Computer System

Figure 1:
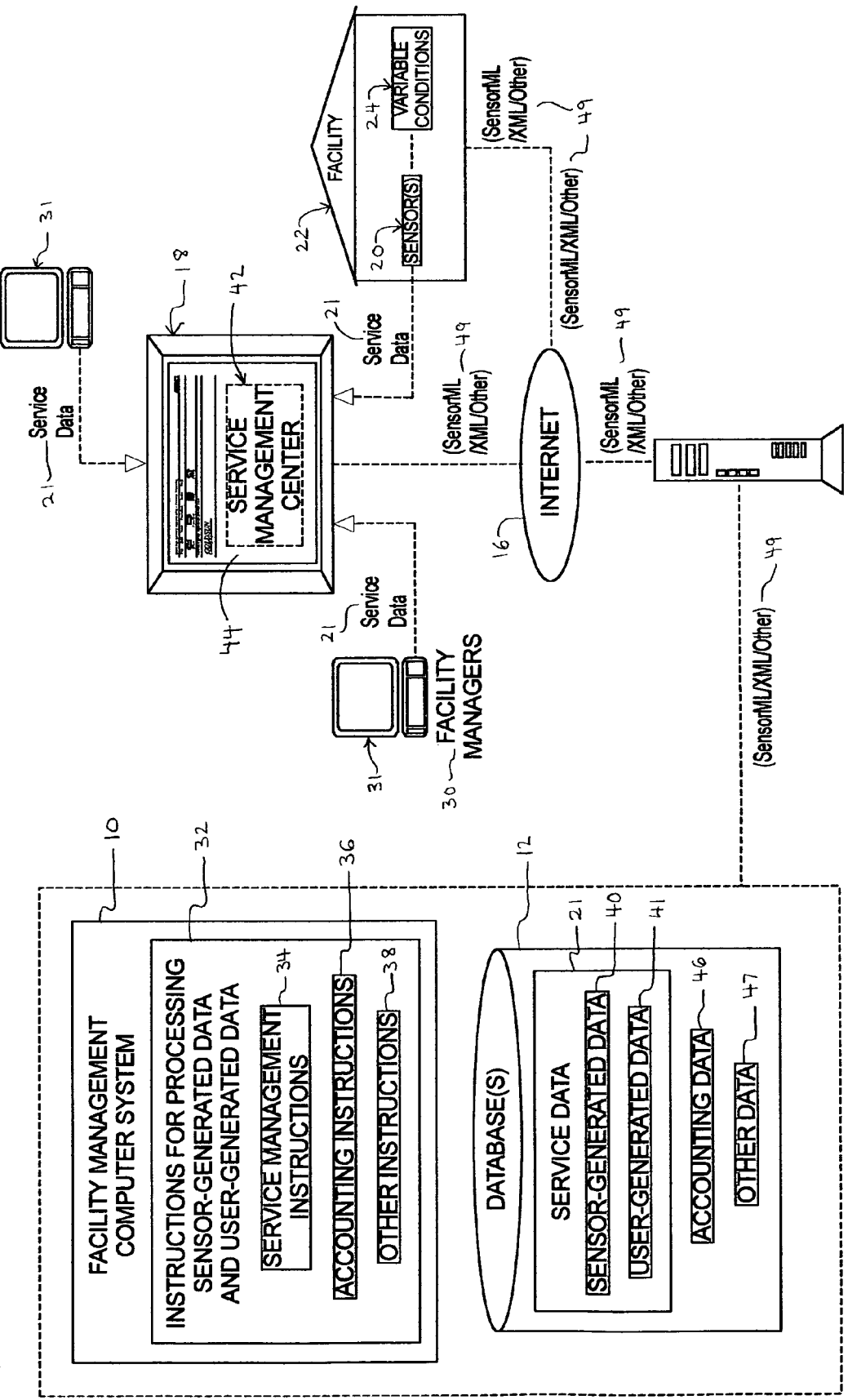
FIG. 1 is a schematic block flow diagram illustrating the operation of the computer system in one embodiment of the present invention.

Referring now to the drawings, FIG. 1 illustrates the facility management computer system 10 of the present invention used in conjunction with one or more databases 12. The computer system 10 directs one or more servers 14, operating on a network, such as the Internet 16, to control or host a graphical user interface (GUI), such as a website 18. Through the Internet 16, the server 14 is also in communication with one or more sensors 20. The sensors 20 are located at or in one or more buildings, parcels of real property or facilities 22.

In one embodiment, the facility 22 includes a structure or building including, without limitation, a multi-unit apartment building or complex, a multi-unit condominium building or complex, a house, residential housing, a dormitory, a hospital, a long term or short term healthcare facility, a train station, a sports stadium, a concert hall or an entertainment hall. In another embodiment, the facility 22 includes a parcel of real estate where people gather to participate in an event, including, without limitation, an indoor or outdoor carnival, public park or amusement park.

In operation, the sensors 20 observe or sense a plurality of variable conditions 24 of the facility 22, and the sensors 20 generate service data 21. The server 14 uses the computer system 10 in order to retrieve the service data 21 from the sensors 20, store the service data 21 in the database 12 and present the service data 21 at the website 18.

In the embodiment illustrated in FIG. 1, the users of the website 18 include: (a) tenants, residents, customers, patrons or other facility users 26; and (b) facility owners and lessors, property management companies and agents thereof, facility operators, clerks, administrators, assistants, customer service representatives and other facility managers 30. It should be appreciated, however, that in one embodiment not illustrated, the website 18 is only accessible to facility managers 30. Here, the facility users 26 send service data 21 to the server 14 from a personal on-line email account or any desirable website on the Internet. In either embodiment, the users of the website 18 can access the website 18 by using a suitable internet access device, such as a phone, personal digital assistant (PDA) or a personal computer 31.

In one embodiment, the facility management computer system 10 includes a plurality of instructions 32 for receiving, manipulating and processing sensor-generated data and user-generated data. These instructions 32 include service management instructions 34, accounting instructions 36 and other suitable instructions 38. The service management instructions 34 include a plurality of instructions associated with transferring and processing data 21 relating to services to be conducted at the facility 22. These services can be used to repair, maintain or otherwise care for the facility 22.

The accounting instructions 36 include a plurality of instructions associated with or relating to receiving, manipulating and processing accounting information or data 46 associated with the facility 22 or the operation or management of the facility 22. This accounting data 46 can include, but is not necessarily limited to, income data, expense data, appreciation data, depreciation data, tax data, accounts receivables (A/R's), bank account data and other financial information.

The computer system 10 includes a plurality of other suitable instructions 38 associated with the processing of data relating to other aspects of managing or operating the facility 22. For example, these instructions 38 may direct the server 14 to receive and process data 47 related to descriptions or characteristics of the facility 22, descriptions or characteristics of facility users 26 or descriptions or information related to the facility manager 30.

As described further below, the service management instructions 34 direct the server 14 to receive and process sensor-generated data 40 derived from the sensors 20. The service management instructions 34 then direct the server 14 to store this sensor-generated data 40 in databases 12. In addition, the server 14 makes the sensor-generated data 40 available or otherwise presents the data 40 to the users at the service management center 42 of the website 18.

As described above, the accounting instructions 36 of the computer system 10 direct the server 14 to enable the users to input, manipulate and access accounting information or accounting data 46 at the website 18. For example, the accounting instructions 36 may cause the server 14 to present the users with a plurality of inputs at the website 18. Upon activation of these inputs, the server 14 presents webpages 44 to the users. These webpages 44 include fields and forms which enable the users to enter, view and manipulate accounting information, such as rental income and accounts receivables. The server 14 then stores this accounting data 46 in the databases 12. As further described below, the computer system 10 also enables the users to manually input user-generated service data 41 at the website 18. This user-generated service data 41 is generated by, entered by, input by or otherwise derived from a human versus a sensor. For example, a manager 30 may receive a phone call about a hazardous stair, and the manager 30 may enter service data 41 at the website 18 pertaining to the hazardous stair. Therefore, the service management center 42 presents not only sensor-generated data 40 but also presents user-generated data 41 related to services of the facility 22.

In operation, the sensors 21 generate sensor-generated data 40 from time to time. The server 14 receives this data 40 and stores this data 40 in the database 12. In one embodiment, the Transaction Control Protocol/Internet Protocol (TCP/IP) is used to enable the devices 31 and sensors 20 to connect to the Internet 16. Each of the sensor 21, in one embodiment, has a software module or hardware component which provides each of the sensors 21 with a data transfer or communication functionality in accordance with TCP/IP. Here, the server 14, each device 31 and each sensor 20 has a unique IP address that can open and communicate through a relatively high number of ports for sending and receiving data to or from one another. The computer system 10 directs the server 14 to receive sensor-generated data 40 from the sensors 20, and the server 14 causes the website 18 to graphically represent this sensor-generated data 40. It should be appreciated, however, that other embodiments can include other protocols suitable for data transmission over the Internet or another network 16.

The structure or format for the service data 21 can include any suitable data format specification or data format 49. In one embodiment, the data format 49 is Extensible Markup Language (XML), a specification developed by the World Wide Web Consortium. In another embodiment, the specification is SensorML, a specification developed by the Open GIS Consortium Inc. The SensorML specification provides an XML schema for defining the geometric, dynamic and observational characteristics of a sensor. In one embodiment, SensorML can be used to support the processing and location of data from many if not all types of sensors, whether mobile or dynamic, in-situ or remotely sensed, or active or passive. The SensorML specification is described further in a Discussion Paper entitled "Sensor Model Language (SensorML) for In-situ and Remote Sensors," published by the Open GIS Consortium Inc. on Dec. 12, 2002. Such Discussion Paper is hereby incorporated by reference into this Detailed Description of the Invention.

A. Sensors

1. Arrangement of Sensors

Figure 2:
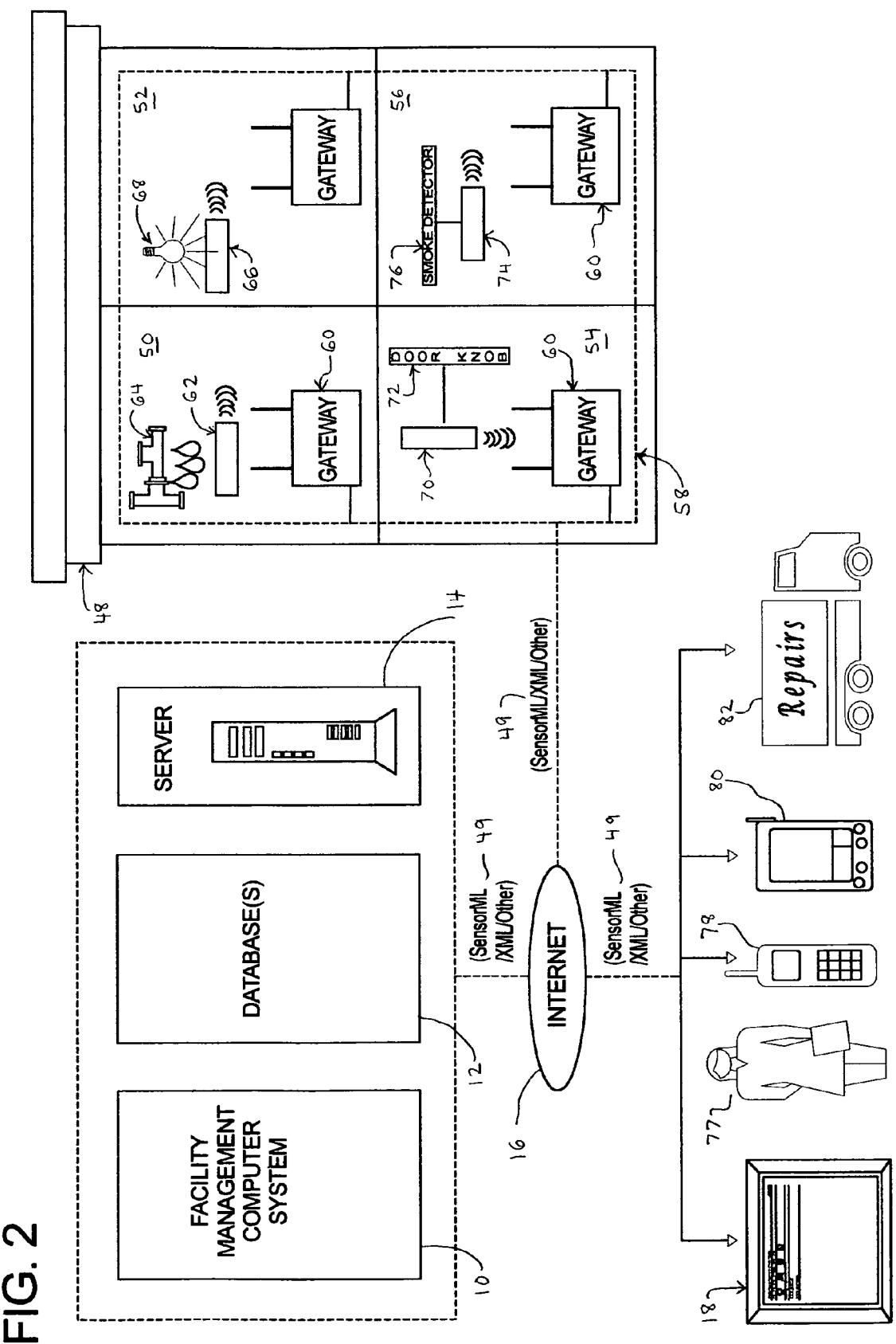
FIG. 2 is a schematic block flow diagram illustrating the operation of the computer system used in conjunction with sensors in an apartment building in order to facilitate repair services.

As illustrated in FIG. 2, the computer system 10 can be used in conjunction with an apartment building 48. The apartment building 48 may include a plurality of living spaces, dwelling units or apartment units. For illustrative purposes only, the apartment building 48 has four apartment units 50 to 56.

In addition, the apartment building 48 includes one or more communication mediums or communication channels 58. The communication channel 58 can include any channel, medium or device which enables the flow of data from the facility 48 to the Internet 16. For example, the communication channel 58 can include a digital subscriber line (DSL), intranet, a local area network, an Ethernet, a satellite uplink, a cellular radio telephone link, a satellite packet data link, a Radio Frequency (RF) transmission, a land line, a microwave link, a satellite transmitted global position system (GPS), an infrared link or any other suitable data link.

In addition, each of the units 50 to 56 includes a router, gateway or other data communication device 60 which receives sensor-generated data 40 from one of the sensors 62, 66, 72 or 76. The communication devices 60 function as communication hubs for one or more sensors located in each of the apartment units 50 to 56. In the embodiment illustrated in FIG. 2, the communication devices 60 are mounted to a wall in an apartment unit. The communication devices 60 can be implemented by one or more microprocessors, firm ware, application-specific integrated circuits and/or memory devices. The communication devices 60 operatively couple the sensors in the apartment units 50 to 56 to the communication channel 48 of the facility, which, in turn, operatively couples these sensors to the server 14 over the Internet 16.

Furthermore, each of the sensor 62, 66, 70 and 74, in one embodiment, include: (a) a microprocessor, such as a commercially available microprocessor chip which includes an internal read only memory (ROM), internal random access memory (RAM), an analog to digital converter (A/D converter) and one or more input-output ports (I/0 ports); (b) one or more sensing algorithms with unique identification codes (UIC) to designate the location of the sensor; and (c) a set of communication codes or signal codes stored in the internal ROM.

In addition, each of the sensors of the present invention include a component, device or circuitry which enables the sensors to transfer sensor-generated data 40 to the communication devices 60, directly to the communication channel 58 or directly to the Internet 16. In one embodiment, the sensors have a transmitter or a transceiver in order to transmit data in the form of a radio frequency (RF) signal. In another embodiment, the sensors have an electronic configuration suitable for transmitting data through electrical power lines. This can be implemented using X10 technology or any other suitable technology. In another embodiment, the sensors are hardwired to the communication devices 60 or to the communication channel 58.

In the example illustrated in FIG. 2, apartment unit 50 includes a sensor 62 used to detect or sense leaks from a plumbing apparatus 64. Apartment unit 52 includes a sensor 64 used to detect or sense the level of light from one or more light apparatuses 68. Apartment unit 54 includes a sensor 70 used to detect or sense to what extent a door knob 72 has become unconnected or disengaged from a door. The sensor 74 in apartment unit 56 detects or senses whether or not a smoke detector 76 is functioning properly. In this example, each of the sensors 62, 66, 70 and 74 generate a radio frequency (RF) signal which is received by the communication devices 60.

In operation, the sensor 62 detects a leak in apartment unit 50, and the sensor 62 generates sensor-generated data 40 pertaining to the leak. The communication device 60 transmits this sensor-generated data 40 to the server 14 over the Internet 16. The computer system 10 enables the server 14 to receive this sensor-generated data 40, store this data 40 in the databases 12 and make this data 40 available to the users at the service management center 42 at the website 18. The same type of process applies to sensor 66 which may detect a loss of light in a stairwell, sensor 70 which may detect a loose doorknob and sensor 74 which may detect a malfunctioning smoke detector 76.

It should be appreciated that any user 77 of the website 18 can access that website 18 using any suitable internet access device such as a cellular phone 78 or a personal digital assistant (PDA) or handheld device 80. For example, if the sensor 74 observes or senses a malfunctioning smoke detector 76, the system 10 can direct the server 14 to transmit an e-mail message to the users' telephone 78 or PDA 80, notifying the user of the malfunctioning smoke detector 76. The user 77 may then arrange for a contractor or service provider to dispatch a repair unit 82 to the facility 48.

2. Types of Sensors

Figure 3:
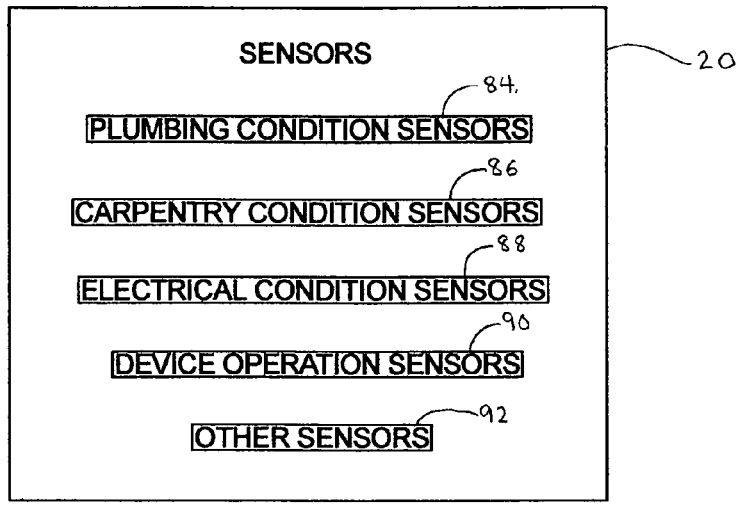
FIG. 3 is a schematic block diagram illustrating the sensors in one embodiment of the present invention.
Figure 4:
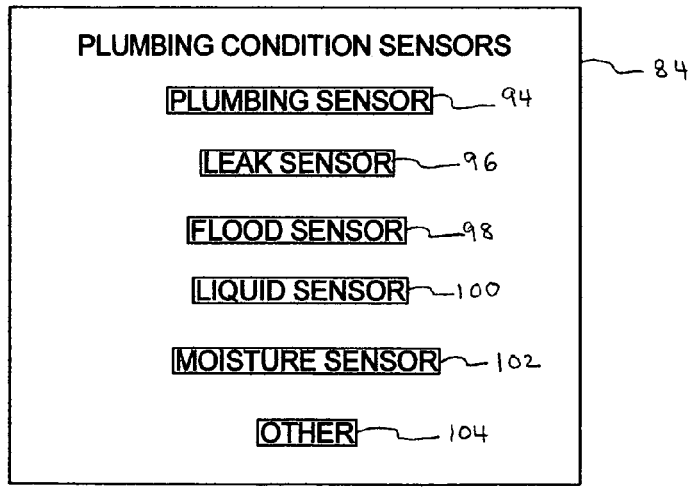
FIG. 4 is a schematic block diagram illustrating the plumbing condition sensors in one embodiment of the present invention.

As illustrated in FIG. 3, the computer system 10 can be used in conjunction with any suitable sensor including, without limitation, plumbing condition sensors 84, carpentry condition sensors 86, electrical condition sensors 88, device operation sensors 90 and other sensors 92. As illustrated in FIG. 4, the plumbing condition sensors 84 can, in one embodiment, include: (a) a plumbing sensor 94 which detects or senses one or more plumbing characteristics; (b) a leak sensor 96 which detects or senses fluid, liquid or water leakage from a plumbing apparatus such as a pipe or a sink; (c) a flood sensor 98 which detects or senses the occurrence and/or level of flooding in a facility; (d) a liquid sensor 100 which detects the presence of liquid; (e) a moisture sensor 102 which detects or senses the degree of moisture or humidity in the facility; and (f) any other suitable plumbing condition sensor 104.

Figure 5:
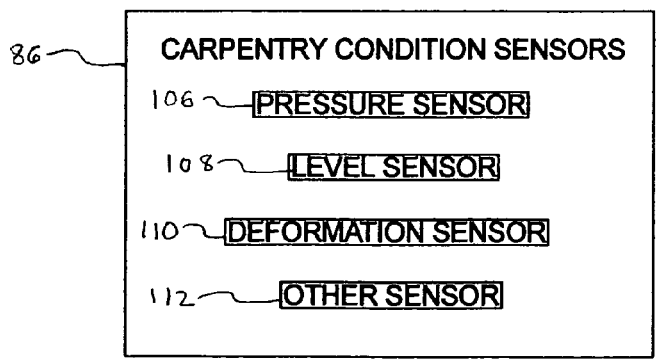
FIG. 5 is a schematic block diagram illustrating the carpentry condition sensors in one embodiment of the present invention.

In one embodiment, the carpentry condition sensors 86, illustrated in FIG. 5, include: (a) a pressure sensor 106 which senses pressure or force per unit area acting upon a surface; (b) a level sensor 108 which senses the extent to which a surface is level; (c) a deformation sensor 110 which senses the occurrence of or extent to which a surface or member bends or otherwise deforms; and (d) any other suitable carpentry condition sensor 112.

In one embodiment, the electrical condition sensors 88, illustrated in FIG. 6, include: (a) a power sensor 114 which senses whether or not there is electrical power or electrical current present in an electrical line or electrical apparatus; (b) a power load sensor 116 which senses the level or extent of electrical power present in an electrical line or electrical apparatus; (c) a power loss sensor 118 which senses a loss or lack of electrical power in an electrical line or in an electrical apparatus; and (d) any other suitable electrical condition sensor 120.

As illustrated in FIG. 7, the device operation sensors 90 sense characteristics of various devices, such as devices 122 to 128. Sensor 130 senses one or more voltage characteristics of device 122. Sensor 134 senses one or more electrical current characteristics of device 124. Sensor 138 senses one or more electrical signal characteristics 140 of device 126, and sensor 142 senses one or more energy storage characteristics 144 of device 128. The sensors 130, 134, 138 and 142 monitor various characteristics of electronic devices such as smoke detectors, carbon monoxide detectors and other devices. For example, the sensor 142 can detect when a smoke detector 128 has a bad battery. In another example, the sensor 138 can detect when a carbon monoxide detector 126 is producing an alarm indicating a harmful level of carbon monoxide in the air. It should be appreciated that the device operation sensors 90 can sense and observe characteristics of different types of devices 600 in facilities, including, but not limited to, washers 602, dryers 604, laundry devices 606, metal detectors 608, game devices 610, vending machines 612 as well as door access systems, card key systems, turnstiles, appliances and cash registers.

Referring to FIG. 8, it should be understood that many electrical or electronic devices 146 can include or incorporate a sensor 20 or the functionality of a sensor. In one embodiment, these devices 146 include utility-related devices 148 and safety-related devices 150. In one embodiment, the utility-related devices 148 include a utility device 152, utility meter 154, heating system 156, cooling system 158, heating ventilation and air conditioning (HVAC) system 160, light system 162 and sprinkler system 164. The safety related devices 150 include, in one embodiment, safety device 166, smoke detector 168, hazardous gas detector 170, carbon monoxide detector 172, fire alarm system 174, fire sprinkler system 176, security system 178, motion detector 180, camera system 182 and door access system 184.

Figure 9:
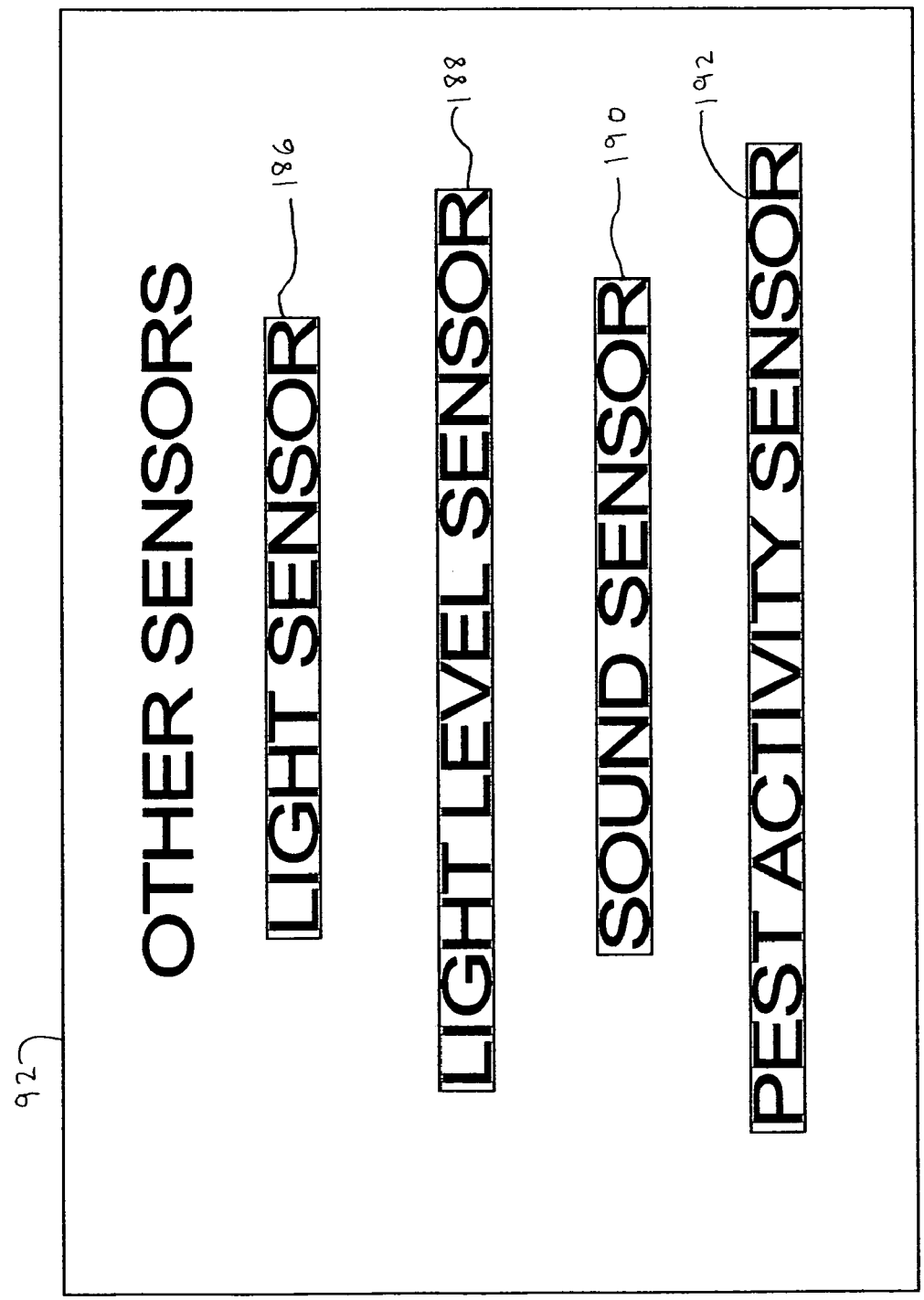
FIG. 9 is a schematic block diagram illustrating other sensors in one embodiment of the present invention.

Each of these devices 148 and 150 can produce signals or transmit data associated with an operational characteristic of such devices or a characteristic of the facility where the devices are located. It should be appreciated that the computer system 10 can be used in conjunction with other sensors 92 illustrated in FIG. 9. In one embodiment, sensors 92 include: (a) a light sensor 186 which detects the presence of light in an area or space of a facility; (b) a light level sensor 188 which detects the level of light in an area of the facility; (c) a sound sensor or audio sensor 190 which senses the occurrence of a designated sound wave or a designated magnitude of sound in or around a facility; and (d) a pest activity sensor 192 which senses the activity of pest in or around the facility, such as the motion of insects or rodents.

B. Website Functionality

1. Service Management Center

Figure 10:
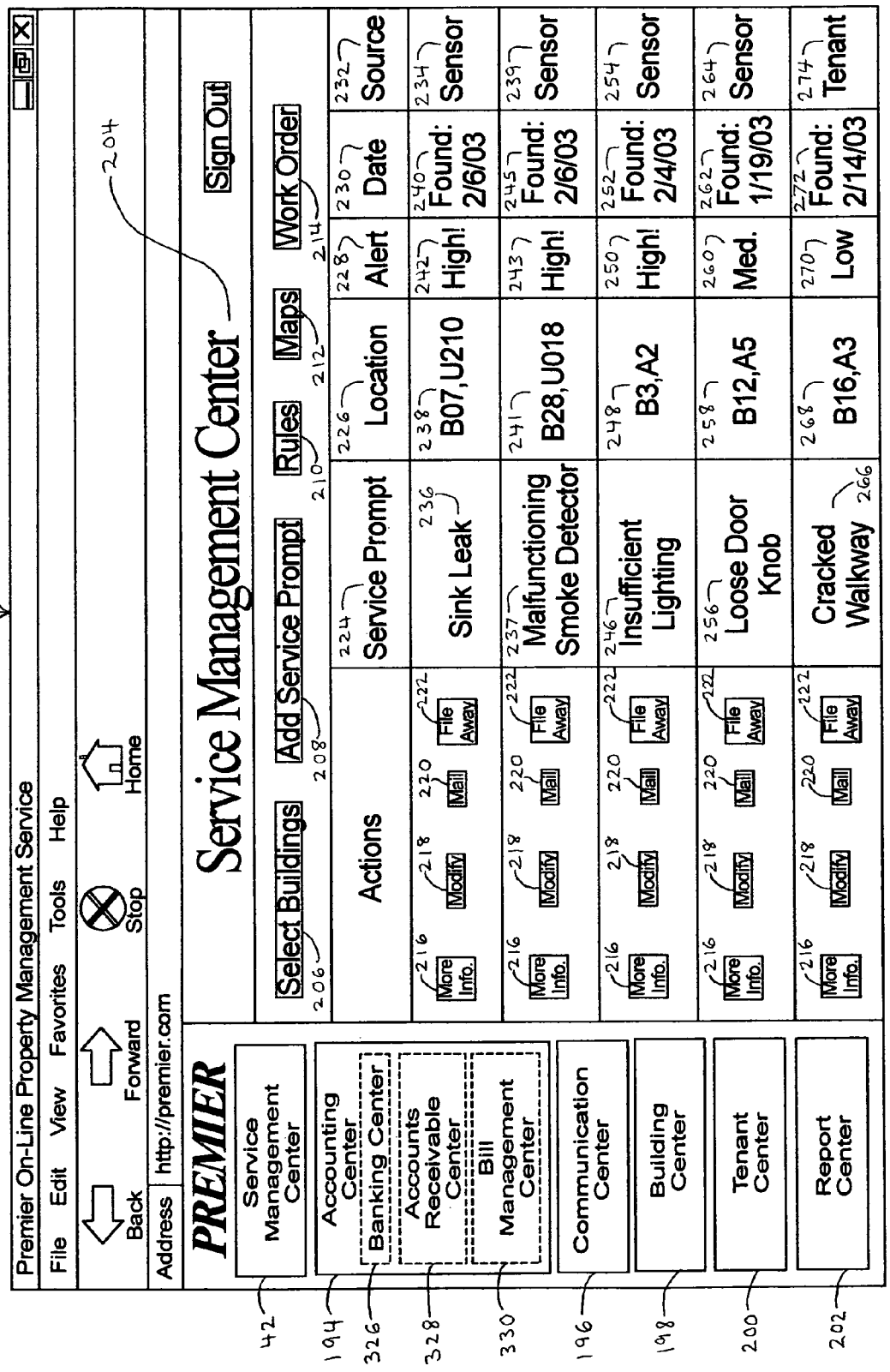
FIG. 10 is a plan view of an example of a service management center web page of the website controlled by the computer system in one embodiment of the present invention.

In one embodiment illustrated in FIG. 10, the computer system 10 enables the server 14 to host a website 18. The website 18 includes: (a) a service management function or center 42; (b) an accounting function or center 194; (c) a communication function or center 196; (d) a building function or center 198; (e) a tenant function or center 200; and (f) a report function or center 202. For each of these centers 42, 194, 196, 198, 200 and 202, the computer system 10 includes a set of computer readable instructions associated with each of such centers. When a facility manager 30 logs onto the website 18, the manager 30 has access to each of these centers.

The computer system 10 directs the server 14 to provide the facility manager 30 with one or more hyperlinks or graphical inputs associated with the service management center 42. Upon the user's activation of these inputs, the server 14, under direction of the computer system 10, causes the website 18 to display a service management center webpage 204.

The webpage 204 includes a plurality of hyperlinks or inputs 206 to 214. Upon the user's activation of the select buildings input 206, the computer system 10 causes the website 18 to display one or more webpages (not shown). These webpages provide the user with inputs which enable the user to select one or more buildings or properties for which the user is seeking service data. After selecting one or more buildings, the webpage 204 displays only the service data associated with the selected buildings.

Upon the user's activation of the input 208, the computer system 10 causes the website 18 to display one or more webpages (not shown). These webpages present the user with one or more forms, fields, or pull down menus which enable to the user to input or create one or more service prompts. For example, the service prompt may be an annual inspection of the heating system of a facility. Here, a manager can provide a service prompt indicating that a particular heating system of a particular building must undergo an annual maintenance service by August 1 of each year. In another example, if a manager learns on his/her own that a window in the lower level of the facility is cracked, the manager can input a service prompt indicating that this window must be repaired.

Upon the user's activation of the rules input 210, the computer system 10 causes the website 18 to present one or more webpages (not shown) to the user. These webpages present the user with one or more forms, fields and/or pull down menus. By making designated inputs at these webpages, the computer system 10 enables the user to establish certain rules for the service management center 42. For example, one selectable rule may cause a communication to go to dedicated personnel when certain conditions at the facility are detected. For example, a server 14 can send an e-mail or voicemail to an Internet access device of a user any time a water leak is detected. According to another selectable rule, the computer system 10 can cause the server 14 to send daily e-mail reminders to designated managers regarding the repairs listed on the webpage 204 which have not yet been completed.

The maps input 212, upon activation, causes the website 18 to display a plurality of webpages (not shown). These webpages present the user with a plurality of inputs. Upon the user's activation of these inputs, the computer system 10 causes the website 18 to display geographic maps of one or more buildings or facilities. For example, a manager may be responsible for managing six different apartment complexes dispersed throughout the City of Chicago. Each of these complexes may have several service prompts listed at the webpage 204. By activating an input, the website 18 generates a map which graphically indicates the geographic location of each of the service prompts. These maps assist the manager to determine whether or not there has been, for example, a power outage affecting a series of complexes or a gas leakage affecting one or more of the complexes.

In one embodiment, these maps include a set of symbols associated with designated service prompts. For examples different symbols are associated with different events, such as a power outage, gas leakage, fire and hazardous weather report. Accordingly, the manager can view a geographic map which, at a glance, informs the manager of certain events which have affected certain geographical regions. This function assists the manager in making decisions regarding response time which, in turn, facilitates the dispatching of service providers to the facility.

Upon the manager's activation of the work order input 214, the website 18 displays one or more webpages (not shown). These webpages display a designated work order form. The computer system 10 enables the manager to complete this form, addressing a particular service prompt, and then transmit that form to a designated service provider. The computer system 10 enables the manager to transmit this completed form to service providers by e-mail, facsimile or regular mail.

In addition to providing these inputs 206 to 214, the webpage 204 also provides the user with a plurality of inputs or actions 216 to 222 related to a service prompt 224. As described below, service prompts 224 can be provided by managers 30, facility users 26 and sensors 20. A service prompt can include a reminder, a note or a description related to the need to perform a service, such as a repair or maintenance activity. Corresponding to the service prompt 224, is location information 226, alert level information 228, date information 230 and information about the source 232 of the service prompt 224.

In operation of one embodiment, the sensors 20 and managers 30 can input service prompts 224 into the service management center 42. Each service prompt 224 is associated with a particular location 226, an alert level 228, a date 230 and the source of the prompt 224. In the example illustrating FIGS. 10 and 11, a sensor 234 observes a sink leak 236 at location 238—Building 7, Unit 210 on the date 240 of Feb. 6, 2003. Based on the rules 210 selected by the manager 30, the service management center 42 indicates a high alert level 242 for the sink leak 236.

The webpage 204 displays this information to the manager 30 and enables the manager 30 to take action on this information. The manager 30 can take action by activating the more information input 216, the modify input 218, the mail input 220 or the file away input 222. Upon the manager's activation of the more information input 216, the computer system 10 causes the website 18 to display one or more webpages (not shown). These webpages display additional information related to the service prompt 236.

Upon the manager's activation of the modify input 218, the system 10 causes the website 18 to display one or more webpages (not shown). These webpages provide the manager 30 with one or more inputs which enable the manager 30 to inactivate or delete the service prompt 236 or to otherwise modify the service prompt 236, the location 238, the alert 242, the date 240, or the source 234. For example, the manager can change the alert level from high to medium.

Upon activating the mail input 220, the manager causes the service prompt 236 and associated information to be sent to an e-mail address of a designated contractor, janitor, employee or other service provider. Upon the manager's activation of the file away input 222, the computer system 10 enables the manager to enter notes or remarks regarding the service prompt 236. The manger may then file away this service prompt 236 thereby removing it from the webpage 204. The same process applies, in this example, to: (a) the malfunctioning smoke detector 237 detected by the sensor 239 and associated with property location 241—Building 28, Unit 18, high alert 243 and the date 245 of Feb. 6, 2003; (b) the insufficient lighting 246 detected by sensor 254 and associated with property location 248—Building 3, Area 2, high alert level 250 and the date 252 of Feb. 4, 2003; (c) the loose door knob 256 detected by the sensor 264 and associated with location 258—Building 12, Area 5, a medium alert level 260 and a date 262 of Jan. 19, 2003; and (d) a cracked walkway 266 detected by tenant 274 and associated with property location 268—Building 16, Area 3, a low alert level 270 and a date 272 of Feb. 14, 2003.

In the case of the cracked walkway 266, the tenant 274 may have reported this information by phone to the manager, and the manager may have entered this information at the webpage 204. Alternatively, the tenant 274 may have electronically transmitted this service prompt 266 using the communication center 196 described further below.

Figure 11:
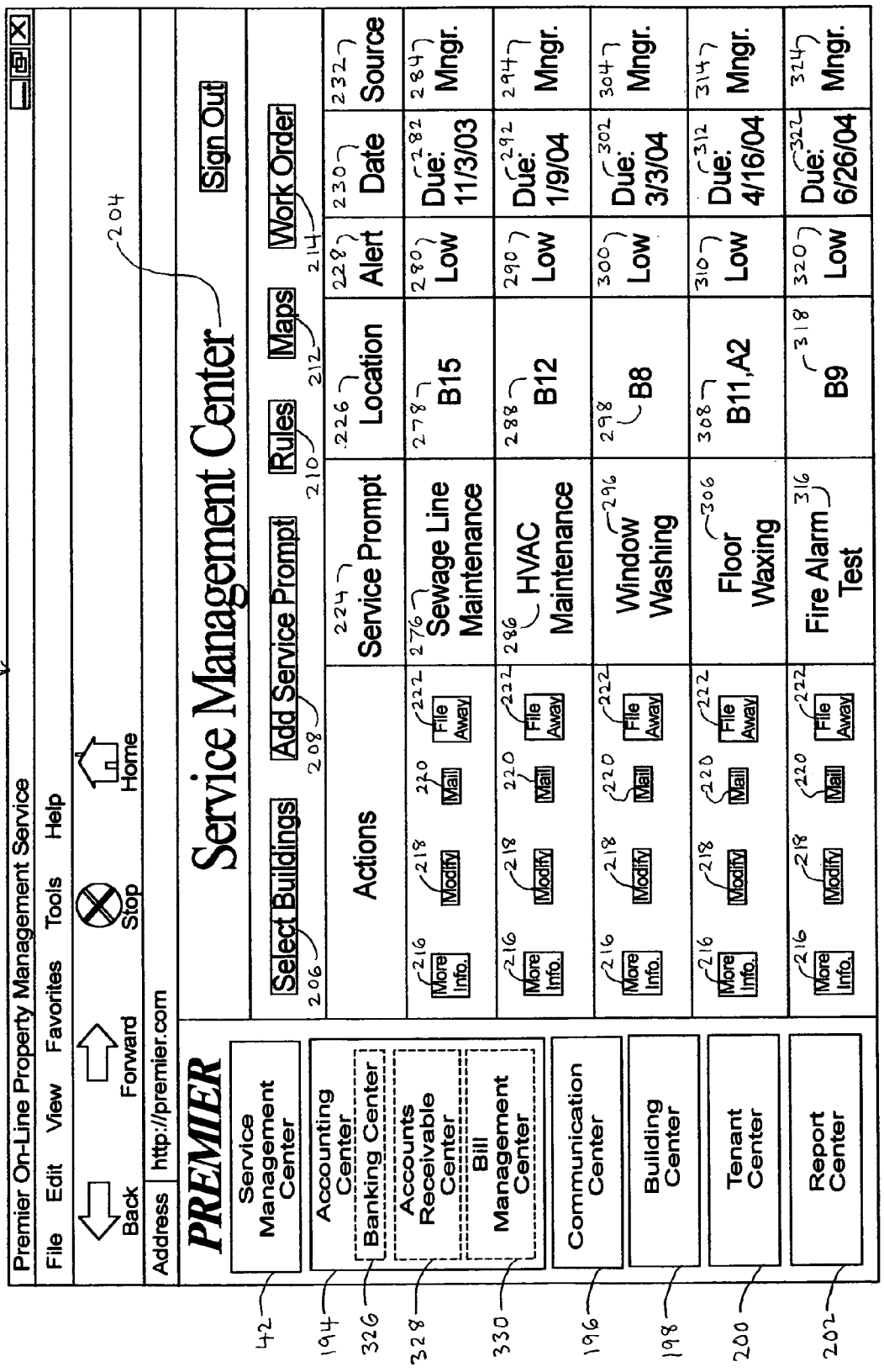
FIG. 11 is a plan view of another example of a service management center web page of the website controlled by the computer system in one embodiment of the present invention.

As illustrated in FIG. 11, the service prompts 224 can also include maintenance prompts or deadlines. In this example, a sewage line maintenance event 276 is entered by a manager 284 and associated with location 278—Building 15, a low alert level 280 and a date 282 of Nov. 3, 2003. An HVAC maintenance prompt 286 is entered by a manager 294. This prompt 286 is associated with a location 288—Building 12, a low priority level 290 and a due date 292 of Jan. 9, 2004. A window washing prompt 296 is provided by a manager 304. The window washing prompt 296 is associated with the location 298—Building 8, a low alert level 300 and a due date 302 of Mar. 3, 2004. A floor waxing prompt 306 is provided by a manager 304. This floor waxing prompt 306 is associated with a location 308—Building 11, Area 2, a low alert level 310 and a due date 312 of Apr. 16, 2004. In addition, a fire alarm test 316 is provided by a manager 324. The fire alarm test 316 is associated with a location 318—Building 9, a low alert level 320 and a due date 322 of Jun. 26, 2004.

These examples illustrate the functionality of the computer system 10 in enabling the service management center 42 to docket user-generated service data and sensor-generated service data. The user-generated service data can come from managers, field workers, contractors, tenants, residents and others. The service management center 42 integrates the user-generated service data with the sensor-generated service data and further enables the users of the website 18 to manipulate this data as he/she deems appropriate.

2. Accounting Center

In one embodiment of the present invention, the accounting center 194 includes: (a) a banking center 326 which enables the user to conduct banking functions such as checkwriting and reconciliation, making deposits, and generally tracking funds. In one embodiment, the banking center 326 enables the user to accept electronic payments from tenants and residents and also make electronic payments to payees. The banking center 326 is preferably operatively coupled to one or more banks or financial institutions which hold funds for a facility manager or owner. The accounts receivable center 328 of the accounting center 194 enables the manager to track payments due by tenants or residents. The bill management center 330 of the accounting center 194 enables the user to access electronic bills and pay those bills electronically or by regular mail.

3. Communication Center

The communication center 196 of the website 18 enables the users of the website 18 to transmit electronic messages to one another which relate to information available at the website 18. In one embodiment, the communication center 196 is operatively coupled to an email management system such as the commercially available Outlook™ system of the Microsoft™ corporation. In this embodiment, the automated service messages originating from the service management center 42 are automatically delivered to the email management system of the user.

In another embodiment, the communication center 196 includes a plurality of instructions which are operatively coupled to a plurality of inputs. These inputs are accessible at the service management center 42, accounting center 194, building center 198, tenant center 200 and/or report center 202. Here, when a user is accessing or inputting certain information at the website 18, the communication center 196 provides the user with the opportunity to send an email to another user by activating an input or hyperlink which is incorporated into or associated with that information.

For example, if the user has a question about an accounts receivable entry, the user can click on that entry, and the communications center 196 displays an email message form which includes information pertaining to that accounts receivable entry. The user may then send an email message to a particular user, for example, asking that user for additional information pertaining to that entry. With this functionality, the communications center 196 provides a plurality of email inputs dispersed throughout the website 18. These dispersed inputs are associated with designated types of information available at the website 18. Upon activation of these inputs, the computer system 10 generates email forms, opens email channels and assists users in sending task-specific emails to others.

In another embodiment, the communication center 196 includes a plurality of instructions which operatively couple a tenant or resident communication channel to the computer system 10. This embodiment enables tenants or residents to send electronic communications or emails to the server 14, which will ultimately be delivered to the website 18. These communications from tenants and other residents can include repair or service-related messages or other messages related to lease renewal, late rent fees, assessment fees, security concerns or other matters.

Figure 12:
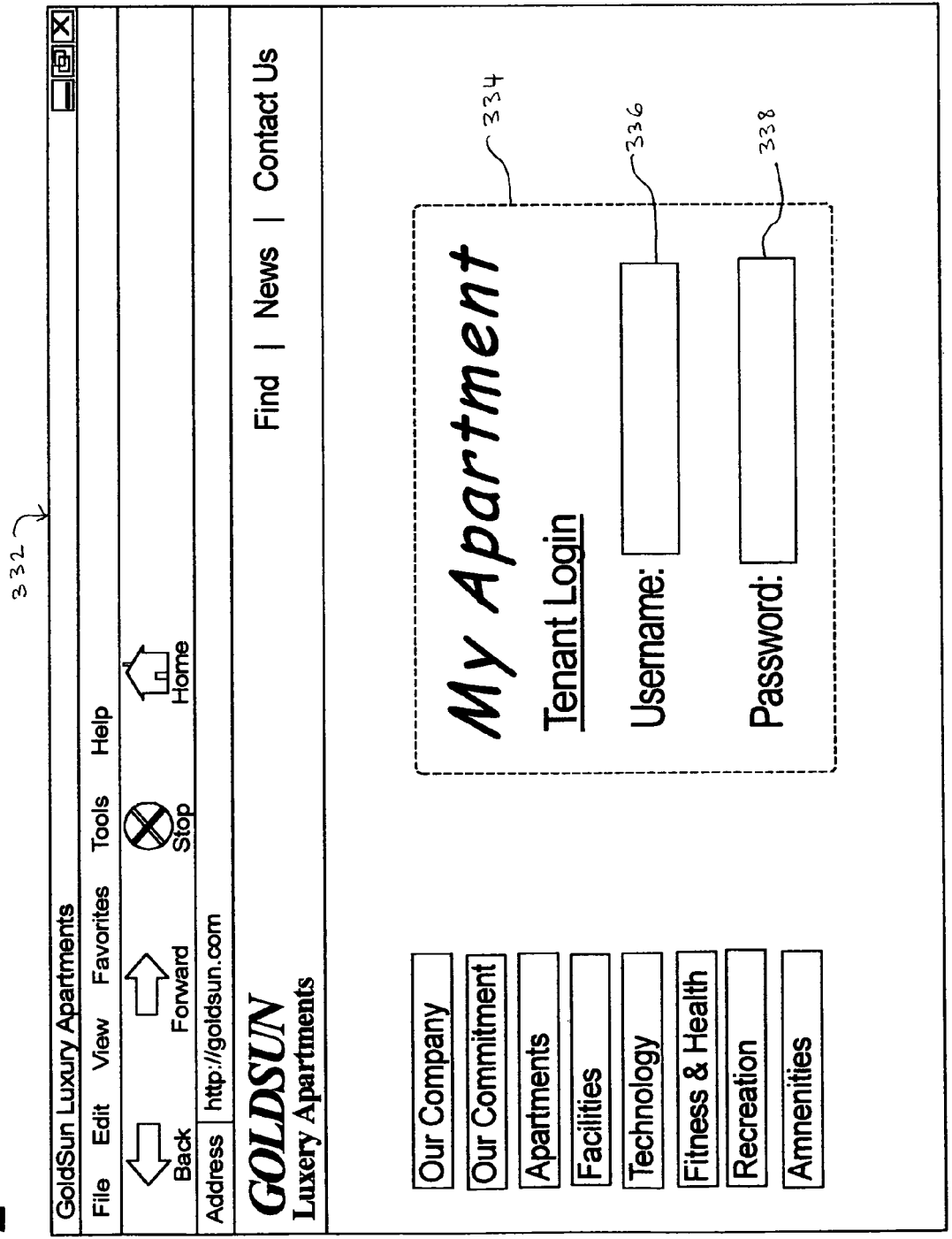
FIG. 12 is a plan view of an example of a website of a facility owner which is operatively coupled to the website controlled by the computer system in one embodiment of the present invention.

In one example of this embodiment illustrated in FIG. 12, GoldSun Luxury Apartments, the owner of an apartment complex, hosts its own website 332. The website 332 is accessible to the tenants of the apartment complex and to the public in general. In this embodiment, the website 332 includes an input 334 which enables a tenant to access private webpages. To access such private webpages, the tenant must enter a user name at field 336 and a password at field 338.

Upon entering the user name 336 and password 338, the website 332 enables the tenant to review certain information about the tenant's apartment and lease, for example. The website 332 also enables the tenant to send an email message. In one embodiment, the website 332 provides the user with a form for preparing an email and a dropdown list or plurality of selectable designated messages. Upon writing a message or selecting one of the designated messages, the website 332 enables the user to activate an input. Upon activation of this input, the website 332 transmits the email message to the communication center 196 of the website 18.

The computer system 10 processes this email. Depending upon the type of email message, the computer system 10 may cause the tenant's message to automatically appear as a service prompt 224 at the service management center 204. Alternatively, the computer system 10 may cause the message to appear in an inbox of the communication center 196. The managers can access the tenant's message and respond accordingly.

4. Building Center, Tenant Center and Report Center

In one embodiment, building center 198 enables the users to store, retrieve and organize information related to the properties and the buildings. This information may include, but is not limited to, property dimensions, size, number of units, age, construction type, zoning parameters, mortgage information, insurance information and other property-related information.

The tenant center 200, in one embodiment, enables the users of the website 18 to store, retrieve and organize information related to the tenants, including, but not limited to, the tenant's name, address, application information, credit history, lease information, security deposit information and other tenant-related information. The report center 202 enables the users of the website 18 to generate reports, graphs and charts which indicate data and information stored in the database 12. Certain of these reports integrate sensor-generated data 40 with user-generated data 41.

C. Coupling Module for Sensor-Disabled Management Systems

Figure 13:
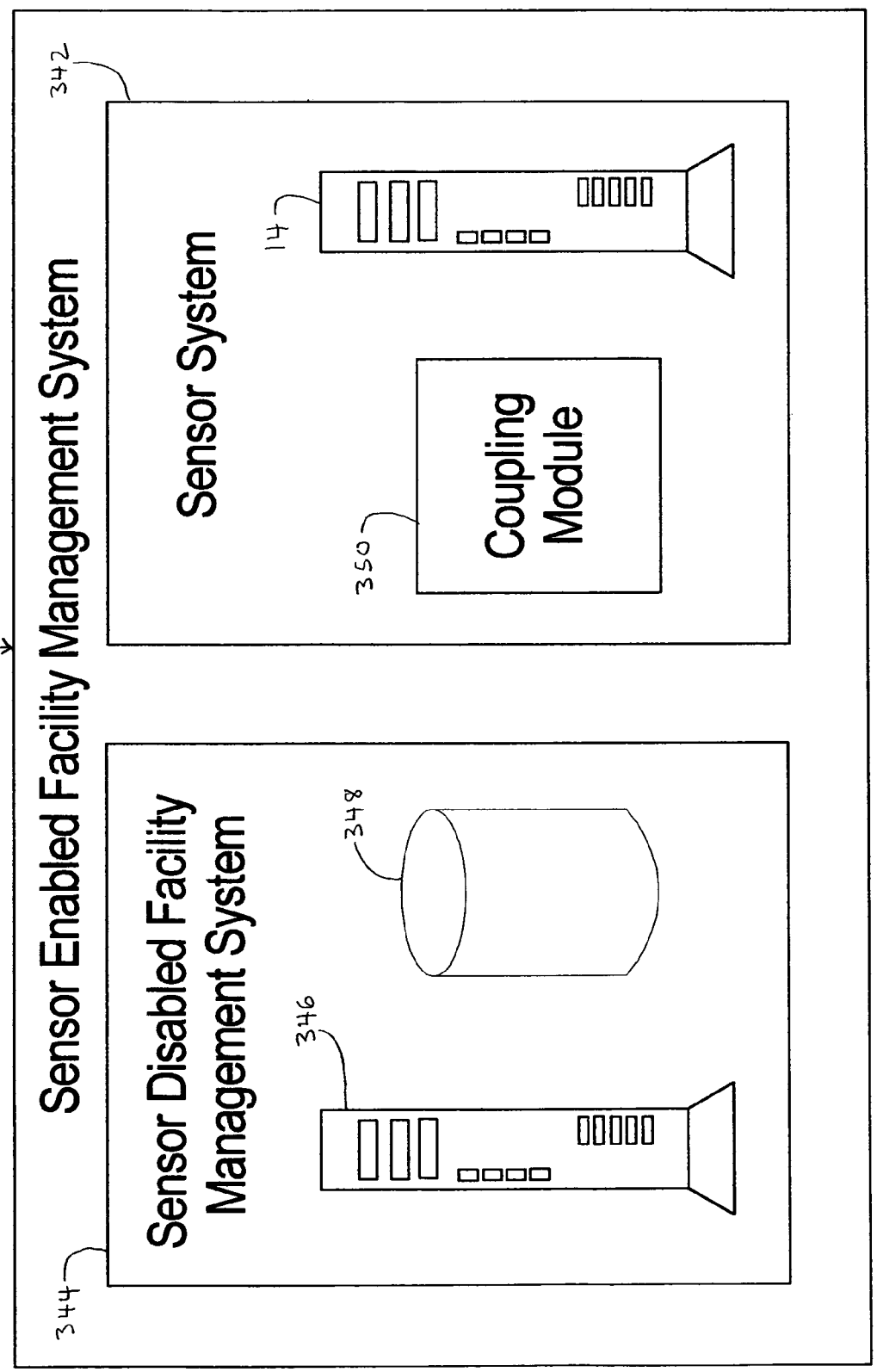
FIG. 13 is a schematic block diagram of a sensor enabled facility management system in one embodiment of the present invention.

Referring to FIG. 13, in one embodiment of the present invention, the computer system 10 is implemented by operatively coupling a sensor system 342 to a sensor disabled facility management system 344. Here, the facility management system 344 is not adapted to process sensor-generated data. However, the manager may be interested in continuing the use of such sensor-disabled facility management system 344. In order to enable such continued use while accommodating sensor-generated data, the present invention includes a sensor system 342 which is operatively coupled to the sensor-disabled facility management system 344.

Figure 14:
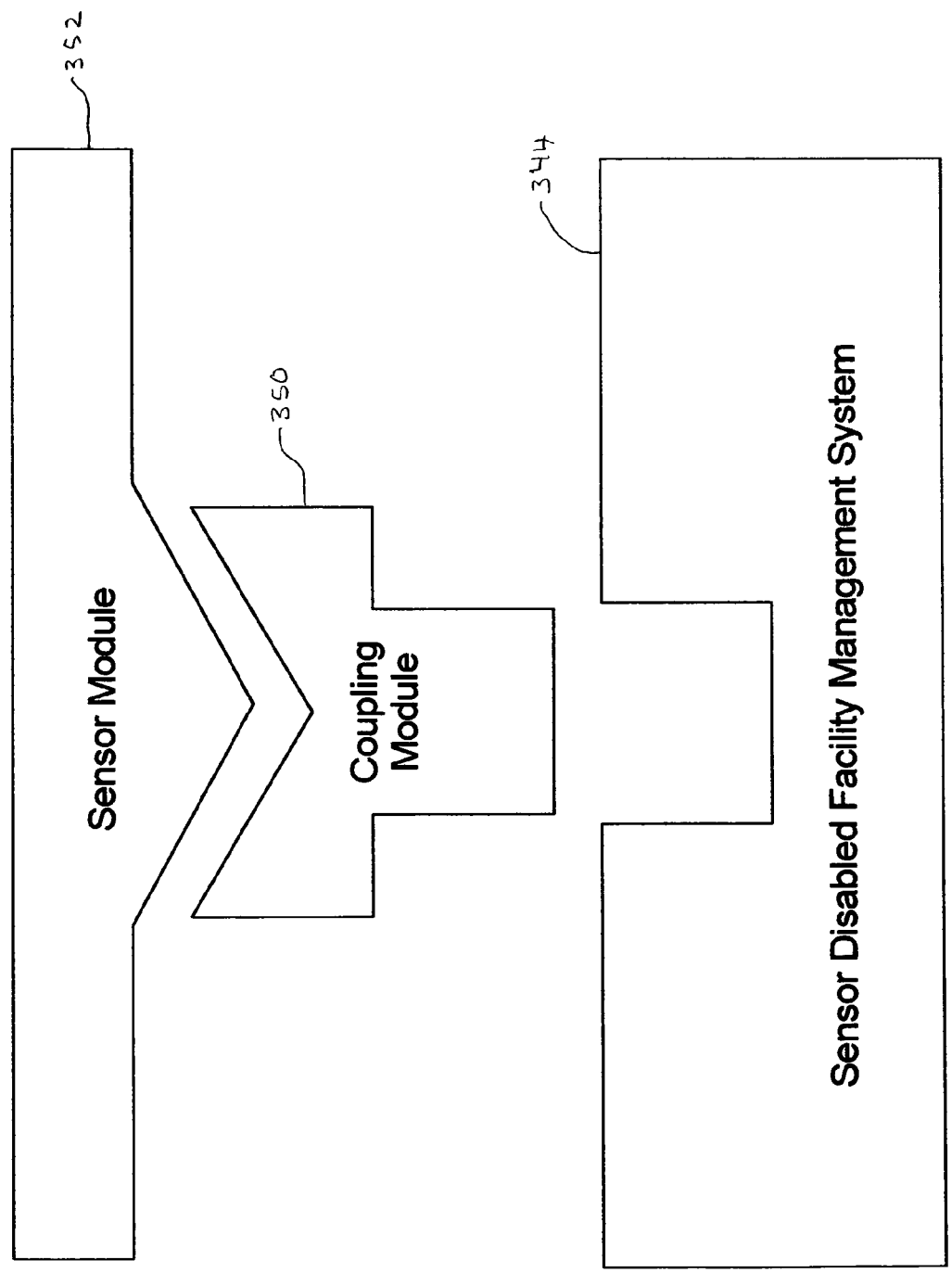
FIG. 14 is a schematic block diagram of a sensor system having a coupling module in one embodiment of the present invention.
Figure 15:
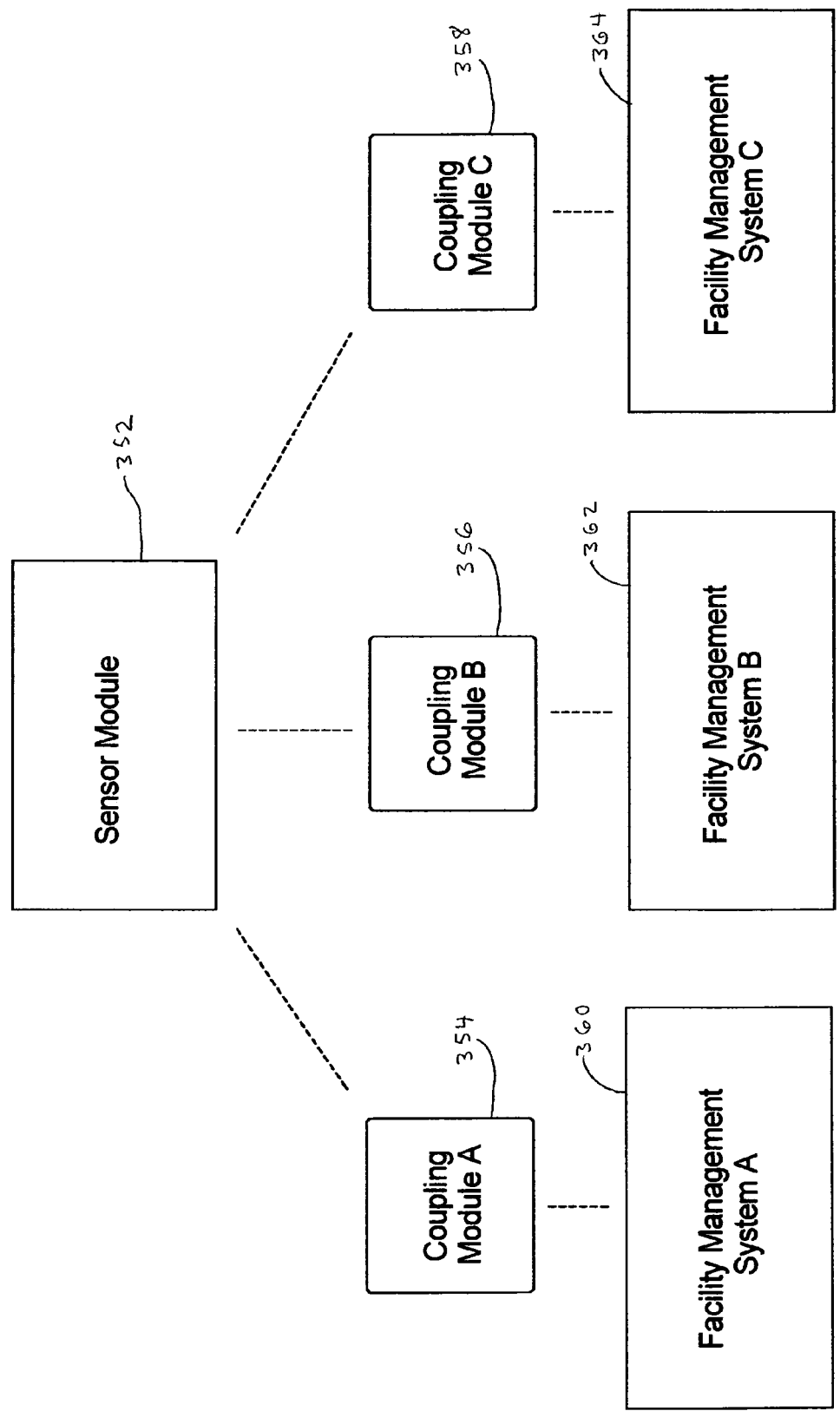
FIG. 15 is a schematic block flow diagram illustrating different coupling modules used to couple a sensor module to different types of sensor-disabled facility management systems in one embodiment of the present invention.

In this embodiment, the sensor-disabled system 344 includes a server 346 in communication with a database 348. In addition, the sensor system 342 includes a server 14 in communication with a coupling module 350. As illustrated in FIG. 14, the sensor system 342 includes a set of instructions associated with processing sensor-generated data. This set of instructions is referred to as a sensor module 352. The coupling module 350 includes a plurality of instructions which operatively or logically couple the sensor module 352 to the sensor-disabled system 344. As illustrated in FIG. 15, the present invention can include different coupling modules associated with different facility management systems. For example, coupling module 354 may operatively couple sensor module 352 to facility management system 360. Coupling module 356 may operatively couple sensor module 352 to facility management system 362, and coupling module 358 may operatively couple sensor module 352 to facility management system 364.

Figure 16:
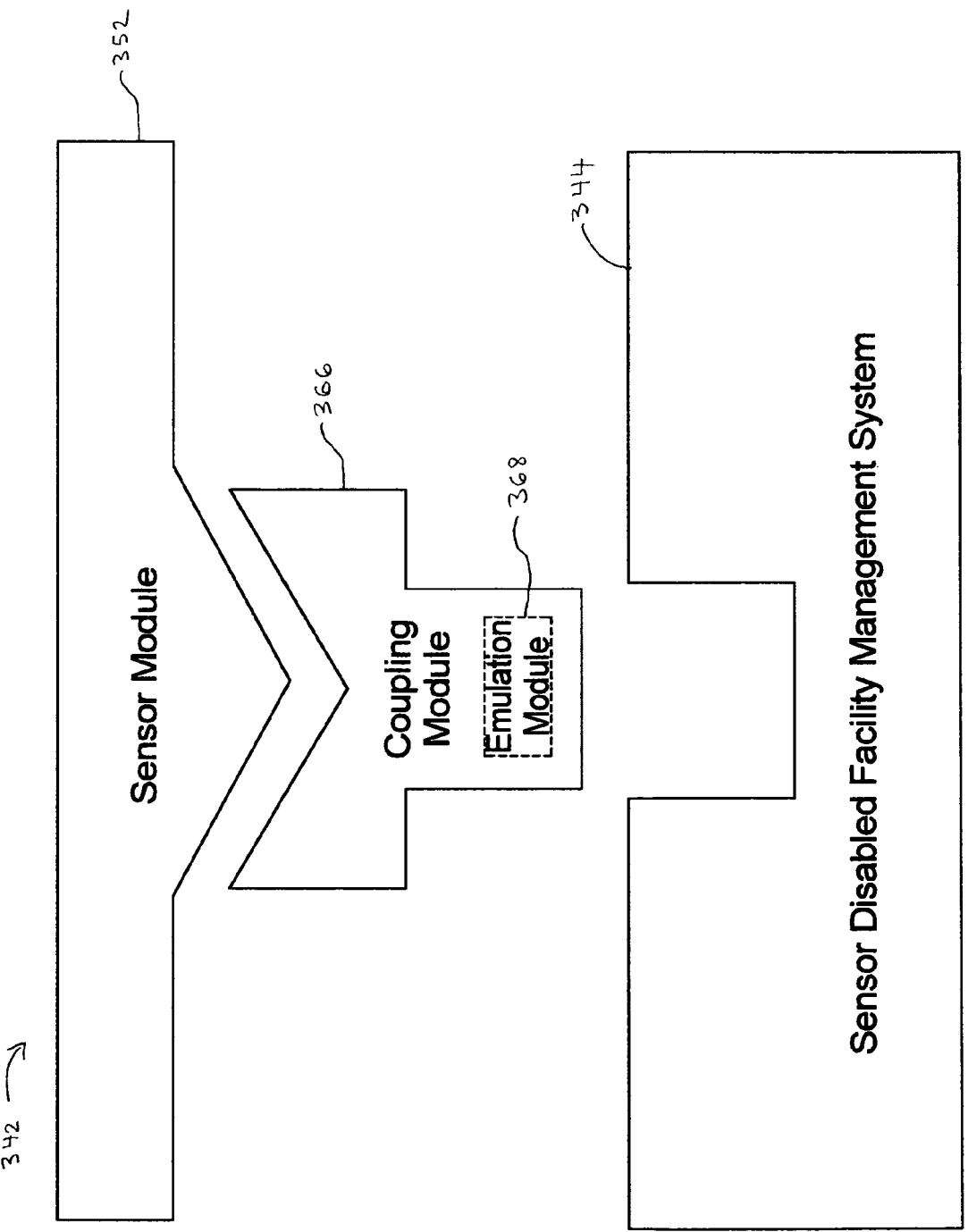
FIG. 16 is a schematic block diagram of a sensor system having a coupling module with an emulation module in one embodiment of the present invention.
Figure 17:
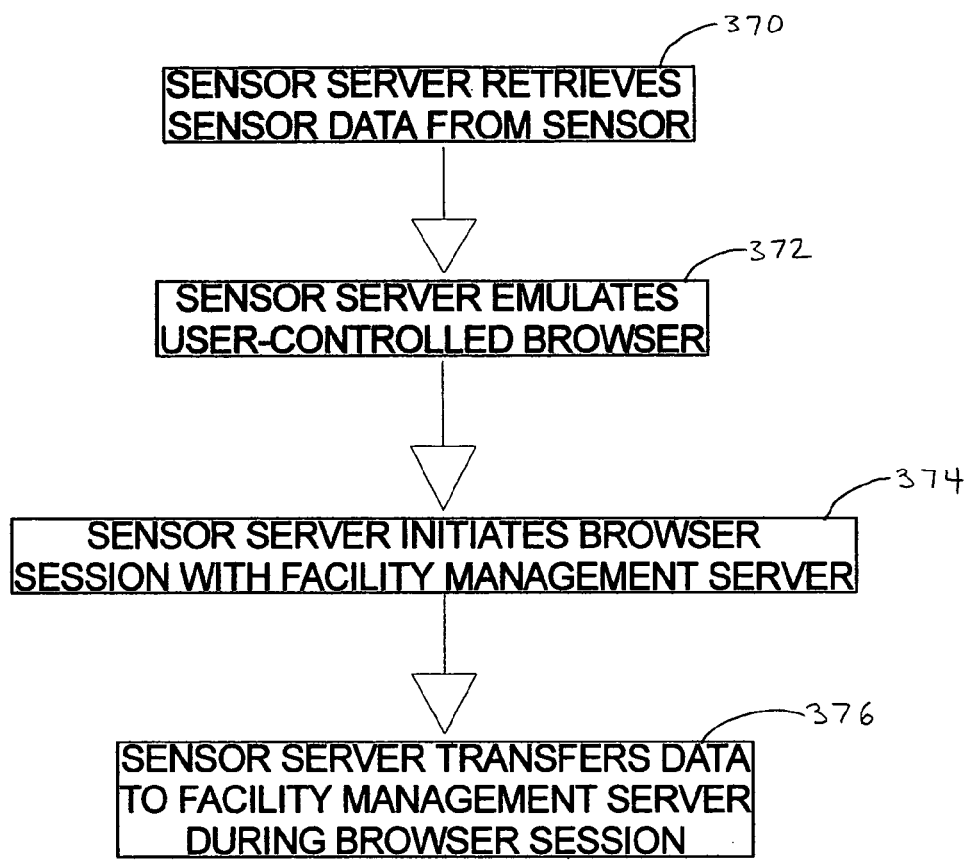
FIG. 17 is a schematic block flow diagram illustrating the operation of the emulation module of FIG. 16 in one embodiment of the present invention.
Figure 18:
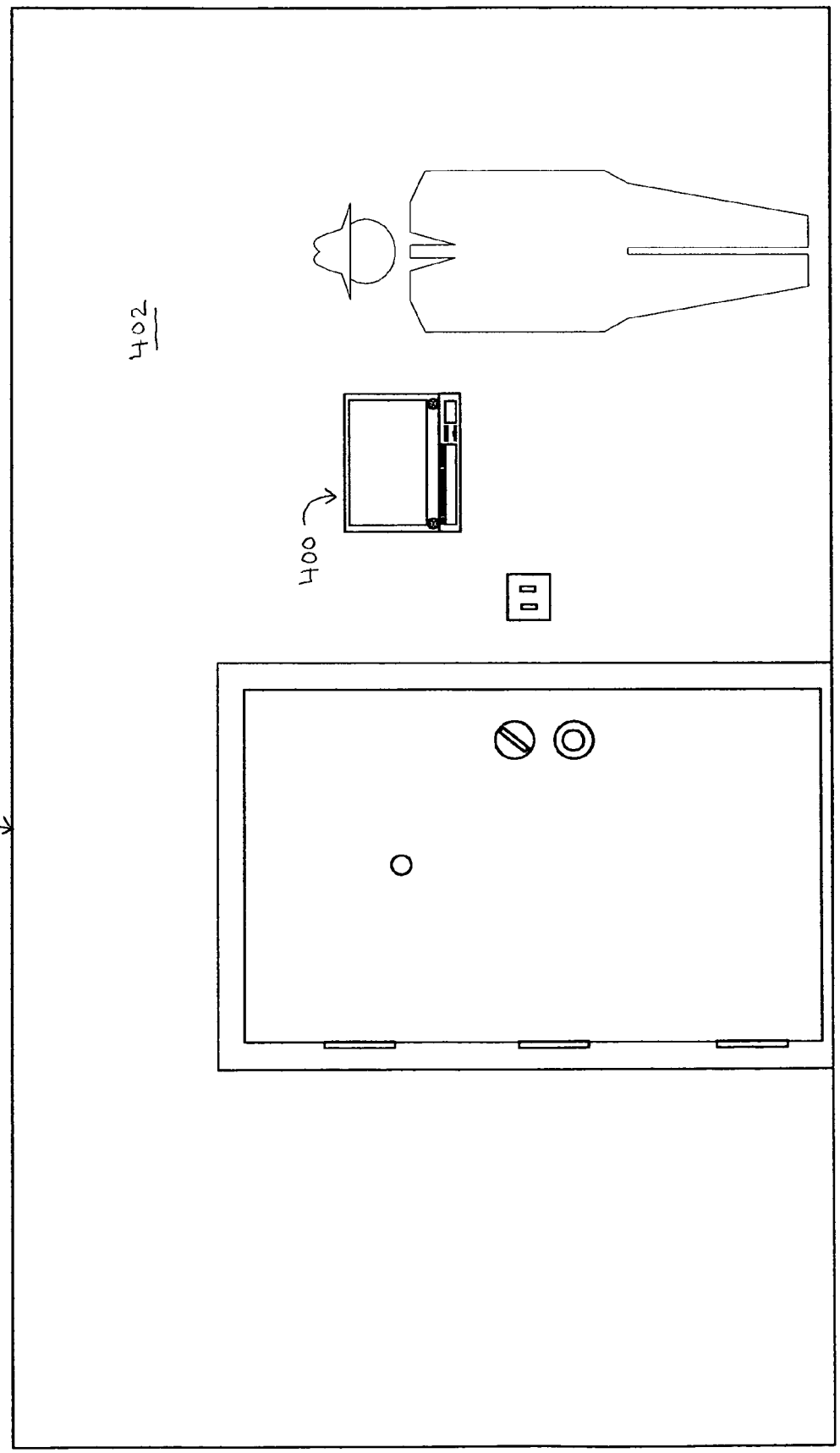
FIG. 18 is a side elevation view of an apartment unit having a computer mounted to a wall in one embodiment of the present invention.
Figure 19:
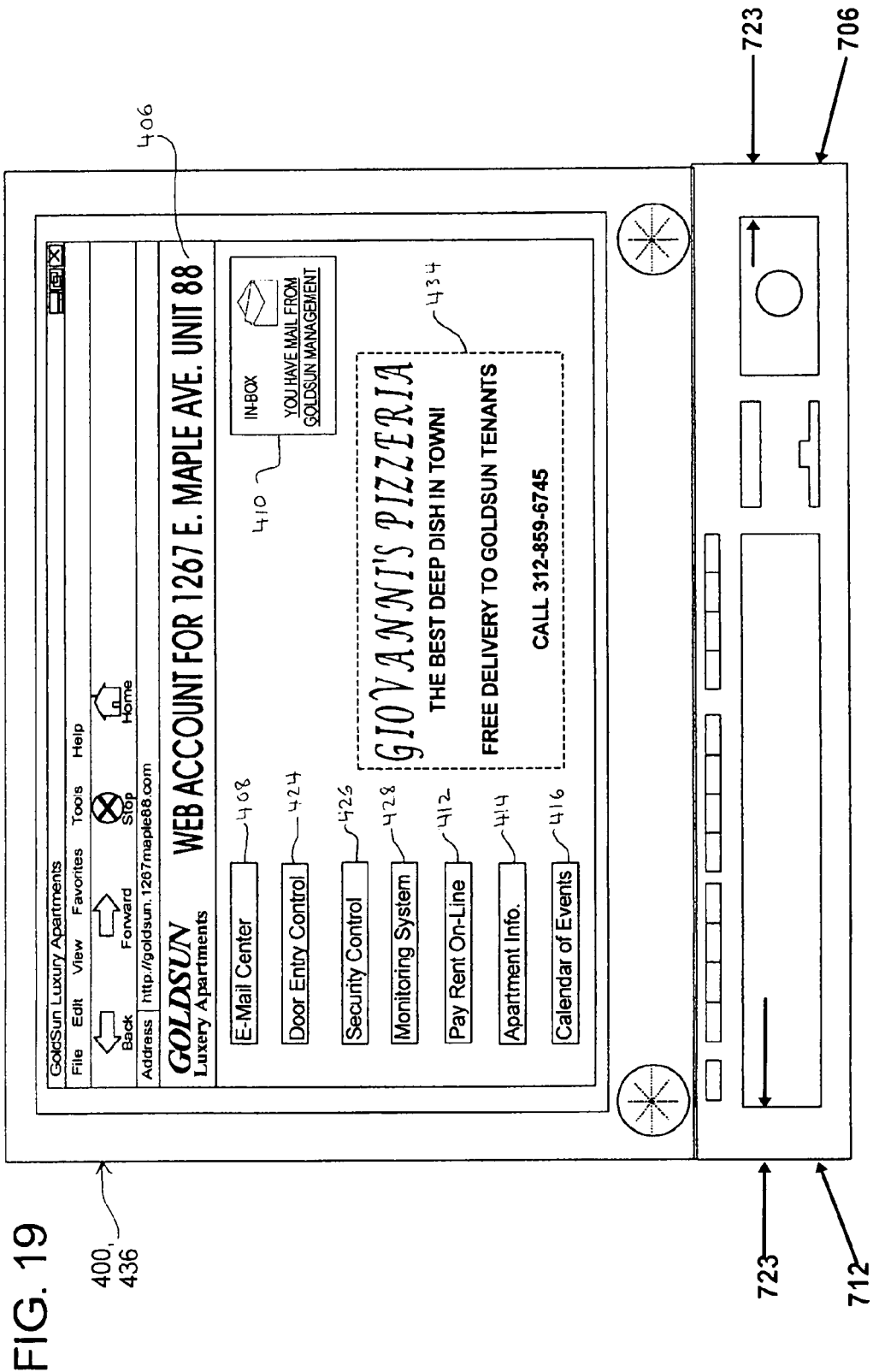
FIG. 19 is a side elevation view of a computer accessing a web account designated for a tenant or other facility user in one embodiment of the present invention.
Figure 21:
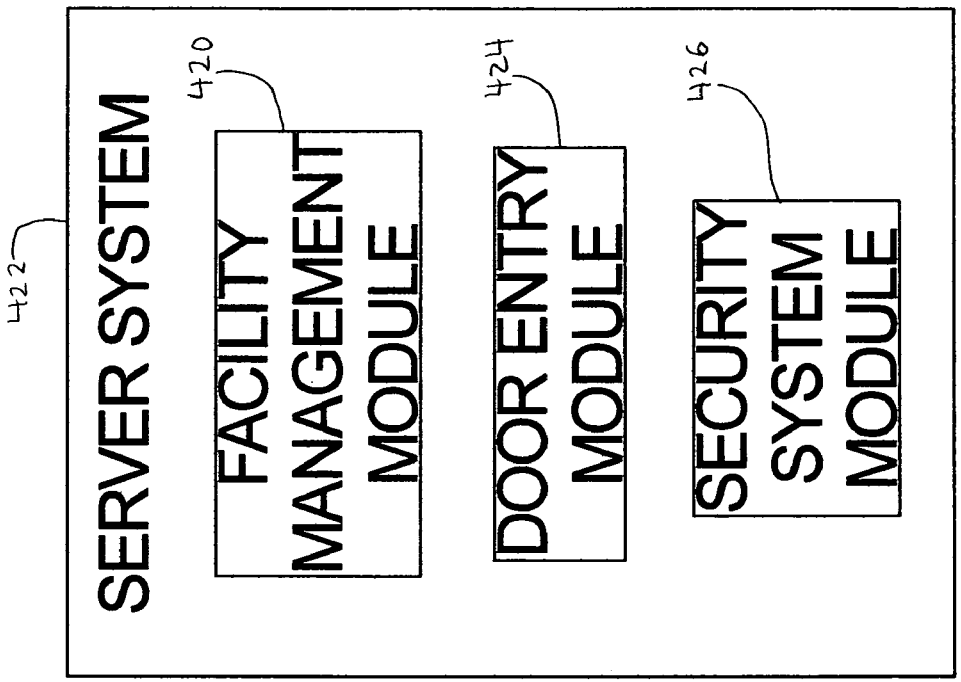
FIG. 21 is a schematic block diagram illustrating a server system used to control the web account of FIG. 19 in another embodiment of the present invention.
Figure 20:
FIG. 20 is a schematic block diagram illustrating a server system used to control the web account of FIG. 19 in on embodiment of the present invention.
Figure 22:
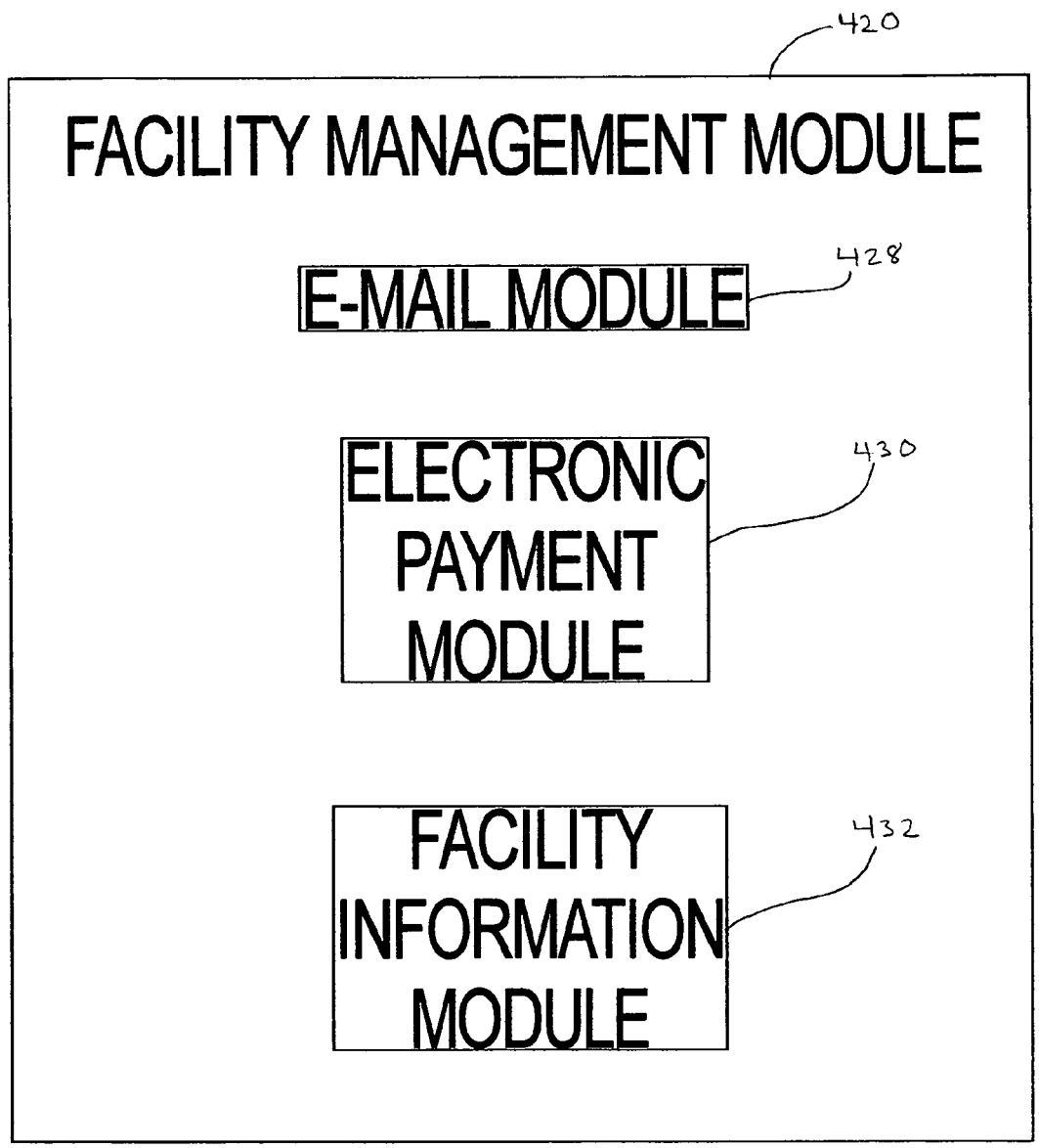
FIG. 22 is a schematic block diagram illustrating a facility management module included in the server systems of FIGS. 20 and 21 in one embodiment of the present invention.
Figure 23:
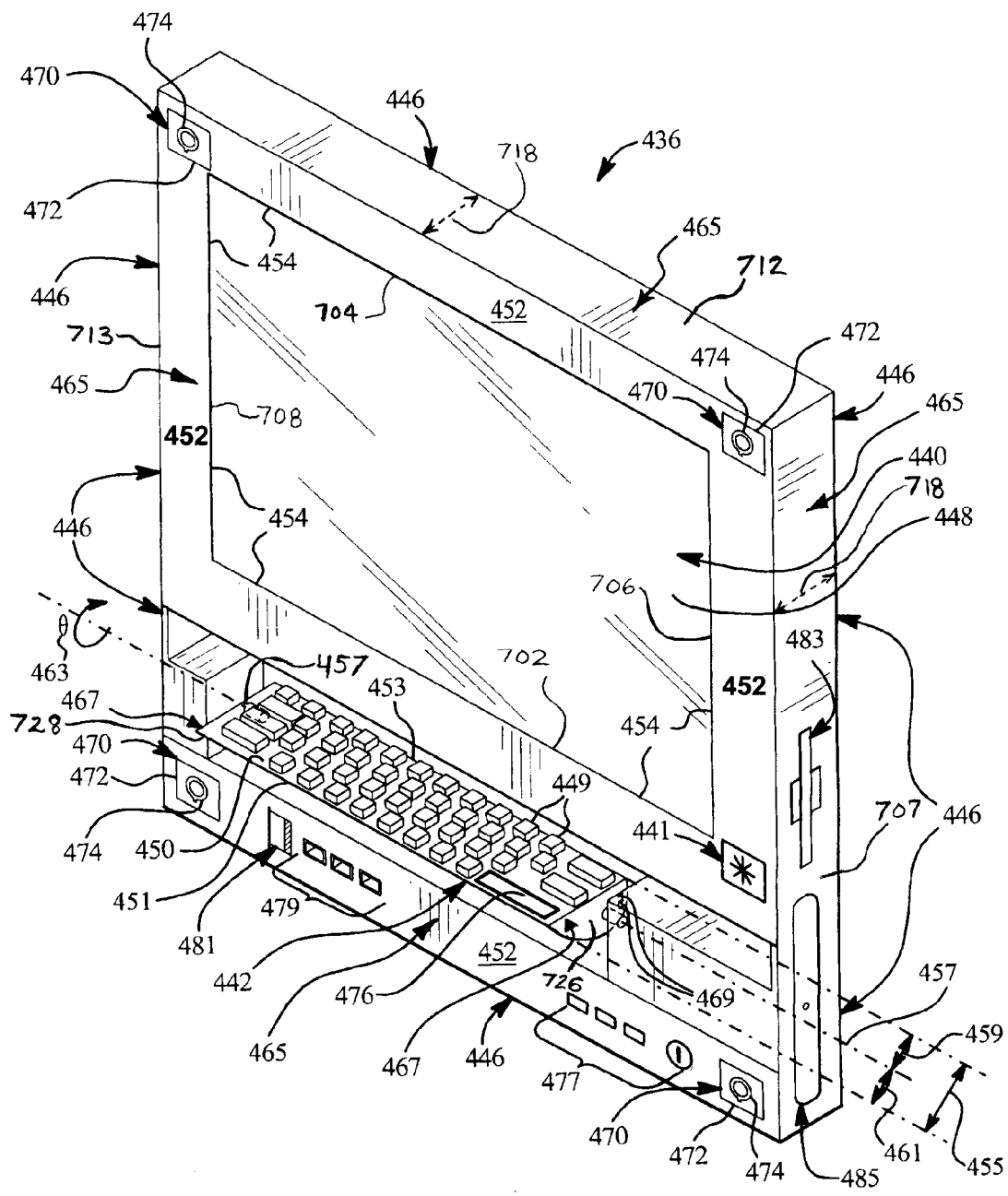
FIG. 23 is an elevated front perspective view of the computer having a rotatable or pivotable keyboard in one embodiment of the present invention.

In one embodiment illustrated in FIG. 16, the coupling module 366 includes an emulation module 368. The emulation module 368 instructs the server 14 to communicate with the server 346 in such a fashion that the sensor-generated data 40 can be processed by the facility management system 344 as if the sensor-generated data 40 were user-generated data. As illustrated in FIG. 17, the emulation process, in one embodiment, involves an initial step 370 of the sensor server 14 retrieving sensor-generated data 40 from the sensor 20. As illustrated in step 372, the sensor server 14 then emulates a user-controlled browser. During the emulation, the sensor server 14 initiates a browser session with the facility management server 346 as indicated in step 374. The sensor server 14 then transfers the data 40 to the facility management server 346 during the browser session, as indicated by step 376. By including the emulation module 368, the computer system 10 of the present invention can be implemented with a sensor-disabled facility management system with little or no reprogramming of the sensor-disabled facility management system.

It should be appreciated that the computer system 10 of the present invention preferably includes a plurality of modules which determine the overall functionality of system 10. Each module includes a set of computer-readable instructions which are related to a designated subject matter, topic or purpose. This type of modular construction of the computer system 10 can be written using any suitable computer programming language, including without limitation, object-oriented languages such as commercially available Java™ or C++™. In one embodiment, each of the different centers 42, 194, 330, 196, 198, 200 and 202 of the website 18, include different modules. It should be appreciated, however, that the computer system 10 can be written as a single module or a single set of instructions.

The computer system of the present invention, in one embodiment, includes a computer system that controls a website that is accessible to facility managers. The computer system is used in conjunction with sensors located at facilities. The computer system enables the website to gather and present sensor-generated data pertaining to the facilities. At the same time, the computer system enables the manager of the facility to use the website as a fully functional facility management system. Accordingly, the manager can manually enter, store, organize and retrieve property management data at the website. The sensor-generated data is integrated with the manually input data. Therefore, the computer system enables the facility manager to access information and reports which incorporate sensor-generated data. This assists the facility managers in increasing the efficiency of operating the facility, minimizing loss and damage to the facility and maximizing profits.

II. Wall-Mountable Computer

A. Facility Management Applications

As described above, in one embodiment of the present invention, the computer system 10 enables tenants, residents and other facility users to transmit email messages and data which is ultimately transferred to the website 18. To increase the convenience of making such communications, the present invention includes a wall-mountable computer.

Referring to FIGS. 18 to 22, the present invention includes a computer 400 adapted to be mounted or secured to an upright or upstanding structure, such as a wall 402 in an apartment unit 404. The computer 400 provides a tenant with access to the Internet and, specifically, with access to a web account 406 designated for the tenant. In one embodiment, the web account 406 includes an e-mail center 408, an inbox 410, a pay rent on-line center 412, an apartment information center 414 and a calendar of events 416.

A server system controls the hosting of the web account 406. In one embodiment, the server system 418 includes a facility management module 420. The facility management module 420 controls the operation of the center 408, inbox 410 and centers 412 to 414. In addition, the facility management module 420 operatively couples the server of the web account 406 to the server 14. Therefore, when the tenant sends an email message or pays rent on-line, these transactions are transferred to the website 18 accessible to the facility managers 30.

In another embodiment, computer 400 includes: (a) a door entry controller 424 enabling the tenant to remotely open an entrance door of the facility for a visitor; (b) a security controller 426 which controls the security system of the apartment unit 404; and (c) a monitoring system 428 which functions as the communicate device 60 described above. In this embodiment, the server system 422 for the web account 406 includes a facility management module 420, a door entry module 424 and a security system module 426.

For both server systems 418 and 422, the facility management module 420 includes: (a) an email module 428 for controlling the operation of the email center 408 and the inbox 410; (b) an electronic payment module 430 for controlling the on-line fund transfer transactions of the on-line rental pay center 412; and (c) a facility information module 432 for controlling and updating the apartment information center 414.

In addition, the web account 406 includes one or more advertisement images 434. In one embodiment, the on-line advertisers contract with the facility owner in order to acquire the right to post such advertisements 434. It should be appreciated that the web account 406 can also display artwork and important graphical information, such as the fire escape route for the apartment facility.

B. Household and Other Applications

Referring to FIGS. 23 to 29, the computer of the present invention can be used, not only in the facility management context, but also in a broad range of other applications, including, but not limited to, a facility, a household or a transport, such as an elevator, an interior portion of a land vehicle, an interior portion of an air vehicle and an interior portion of a water vehicle.

Figure 24:
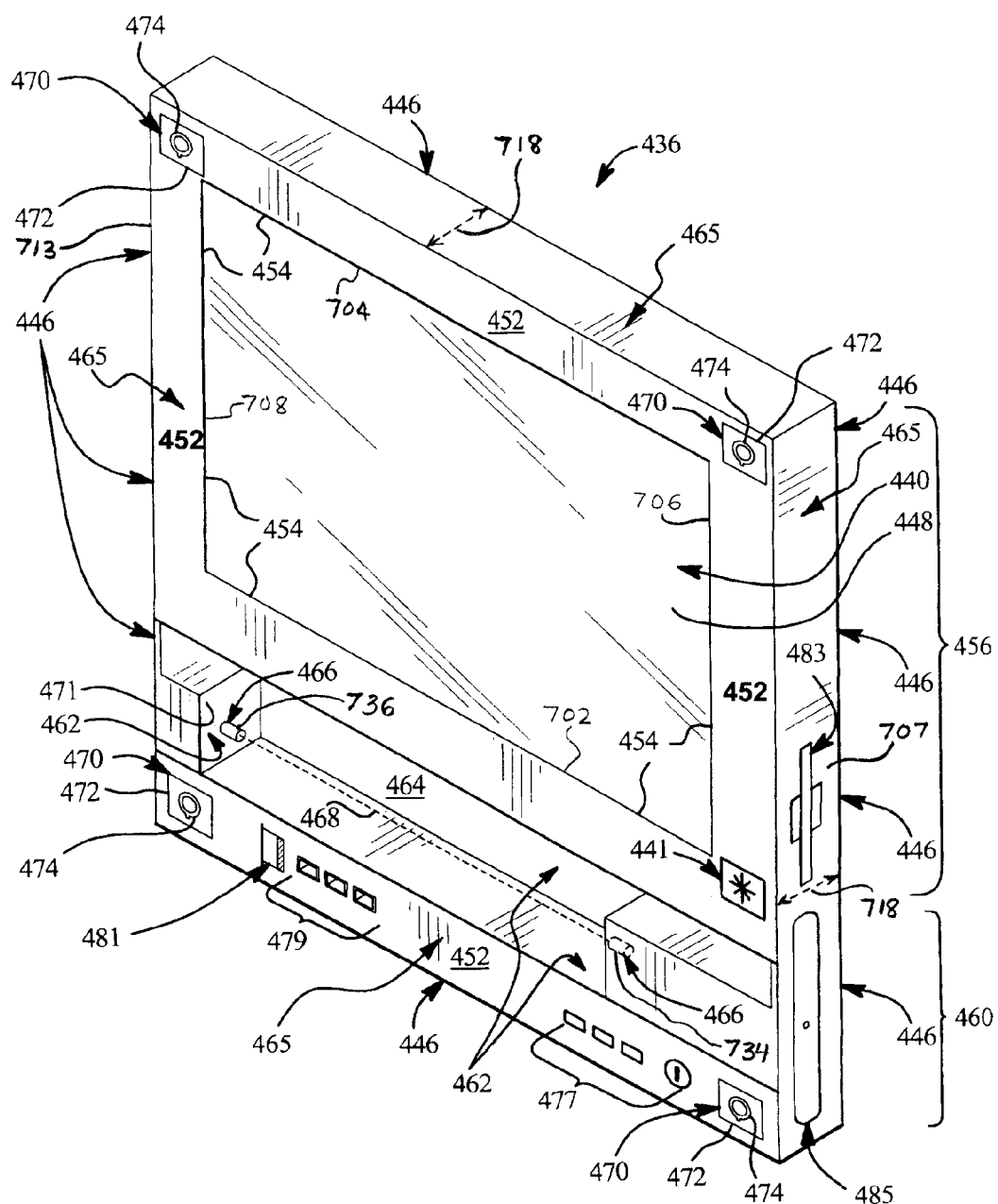
FIG. 24 is an elevated front perspective view of the computer of FIG. 23 shown with the keyboard removed in one embodiment of the present invention.
Figure 27:
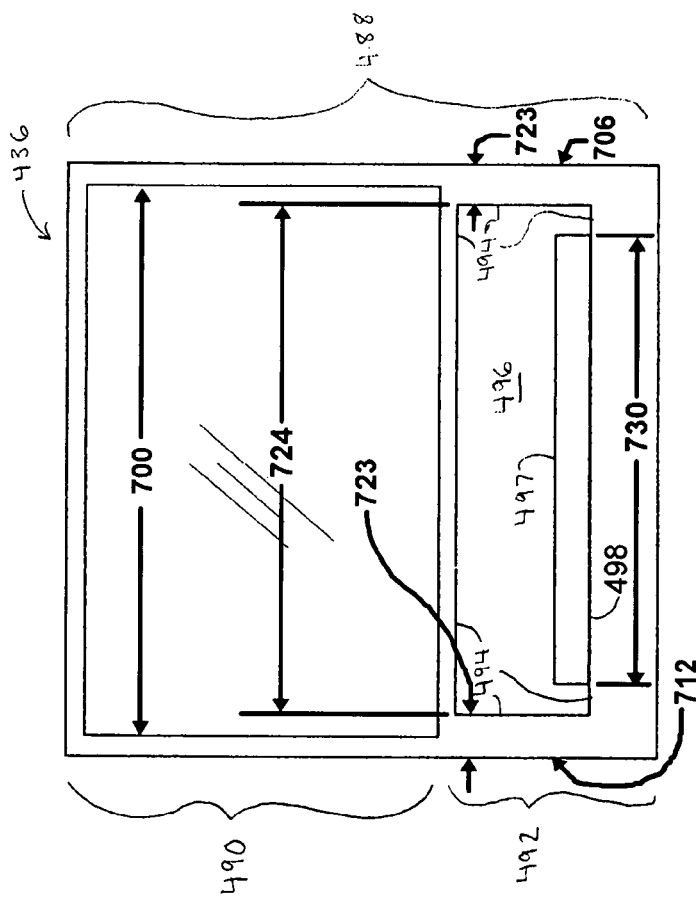
FIG. 27 is a front elevation view of a computer having an opening below the display device for positioning of the hands while the user is operating a keyboard which is connected to the lower portion of the computer housing in one embodiment of the present invention.

The computer 436 is securable to an upstanding structure (not shown), such as a wall, seat or dashboard. It should be understood that the upstanding structure need not be perpendicular to a horizontal plane. The computer 436 includes: (a) a central processing unit (CPU) or processor 438 which controls a display device 440; (b) a keyboard 442 which enables a user to provide inputs to the processor 438; (c) a memory device 444 used by the processor 438 to perform a plurality of computer functions; (d) one or more output devices or speakers 441 for outputting sound; and (e) a housing 446 which houses the processor 438 and memory device 444 and which also supports the display device 440 and the keyboard 442. Referring to FIGS. 19, 23, 24 and 27, one embodiment of the computer 436 includes: (a) a right vertical wall, right wall or right leg 706 having an outward right side 707, an inward left side 708 and a right wall width portion 710; and (b) a left vertical wall, left wall or left leg 712 having an outward left side 713, an inward right side 714 and a left wall width portion 716. The inward left side 708 is spaced apart from the inward right side 714 by the distance 724, as illustrated in FIGS. 24 and 27. The right wall width portion 710 and the left wall width portion 716 each have a width 718. In the embodiment illustrated in FIGS. 23 and 24, the legs 706 and 712 each have a width portion 720 which is different from the width portion 716. The width portion 720 has a width 722 which is smaller than width 718. Having different widths 718 and 722, the legs 706 and 712 illustrated in FIGS. 23 and 24 each have a non-uniform width profile. In the embodiment illustrated in FIGS. 19 and 27, however, the legs 706 and 712 each have a uniform width 723.

The display device 440 has: (a) a screen 448 which is flat or substantially flat. Therefore, the screen 448 is substantially positionable in a plane. The screen 448 has a lower segment 702, an upper segment 704, a right segment 706 and a left segment 708. The display device 440 has a screen width 700, a right wall 702 and a left wall 704. The keyboard 442 has: (a) a top surface 450; (b) a typing portion 732 having a typing width portion 733 and a plurality of rows of key input devices or keys 449 on the top surface 450; (c) a front side region or front side 451; (d) a back side region or back side 453; (e) a plurality of end regions or ends 467 (including right end 726 and left end 728), each of which has a length 455, midpoint 457 and portions 459 and 461; and (f) an input device width or keyboard width 730. The top surface 450 is also substantially flat and therefore substantially positionable in a plane. In addition, the keyboard 442 has a cylindrical-shaped or semi-cylindrical shaped bottom surface. As described below, the user can adjust the position of the keyboard 442, through an angle 463, so that the top 450 of the keyboard 442 and the screen 448 substantially lie in the same plane.

The housing 446 has a back surface (not shown) which is engagable with the upstanding structure, and the housing 446 has a front surface 452 and a plurality of outer walls 465 including a lower segment 710, an upper segment 712, a right segment 714 and a left segment 716. Each of the segments 710, 712, 714 and 716 has the face or front surface 452, a side surface 718 and a back surface. In one embodiment, the front surface 452 is an integral, one-piece member constructed of a single mold. The front surface 452 has a plurality of walls 454 that define a screen opening (not shown) or a screen region 456. The screen opening is positioned in line with the screen 448 of the display device 440. The walls 454 surround the screen 448, enabling the user to view the screen 448 through the screen opening.

In addition, the front surface 452 has a keyboard region 460 located below the screen region 456. The front surface 452 has a plurality of inner walls or walls 462 defining a cut-away, space or cavity 464 within the keyboard region 460; and (b) at least one, and preferably a plurality of spaced apart coupling members 466 positioned within the keyboard region 460. The coupling members 466 are positioned along a common axis 468. In the embodiment illustrated in FIGS. 23 to 24, the coupling members 466 are rods or shafts which function as pivot points for the ends 467 of the keyboard 442. In the embodiment illustrated in FIGS. 23 and 24, the right coupler 466 has a right shaft portion 734, and the left coupler 466 has a left shaft portion 736. Here, the walls 462 function, in part, as guard members that protect the keyboard 442 from impact from people and objects.

The keyboard 442 is pivotable or rotatable between a first or closed position and a second or open position. In the closed position, the keyboard 442 is upwardly rotated or pivoted until the plane of the top surface 450 of the keyboard 442 is substantially parallel with the plane of the screen 448. In this position, the keyboard 442 is least likely to be damaged caused by contact with a person or an object passing by the computer 436. In addition, the closed keyboard 442 causes the computer 436 to occupy less space. In the open position, keyboard 442 is downwardly rotated or pivoted until the plane of the top surface 450 of the keyboard 442 is substantially perpendicular to or otherwise intersects with the plane of the screen 448. In this open position, illustrated in FIG. 23, the keyboard 442 has a conventional horizontal operating position even though the screen 448 has a vertical position. This makes is convenient for users to operate the keyboard 442 while standing, for example, in a kitchen.

In one embodiment, the housing 446 includes a keyboard position control device 469. In the illustrated embodiment, the position control device 469 includes a plurality of equally spaced-apart protrusions. The protrusions are positioned on the ends 467 of the keyboard 442. These protrusions removably mate with a plurality of slots (not shown) defined by each of the end walls 471 of the keyboard region 460. In operation, the user applies a certain degree of force in order to unseat the protrusions from the slots to reposition the keyboard 442.

In addition, the computer 436 has a plurality of securing members 470. Each securing member 470 includes a wall 472 which extends from the front surface 452 through the back surface of the computer 436. The wall 472 defines a fastener opening that is sized and shaped so as to receive a suitable screw, bolt or other fastener (not shown). The user can affix or secure the computer 436 to an upstanding structure, such as a kitchen wall, by inserting such fasteners through such fastener openings and securing the fasteners to the upstanding structure. Also, the securing members 470 include lock members or devices 474. The lock devices 474, in one embodiment, include a keyhole which enable only a user with a key to access such fasteners.

In one embodiment, the computer 436 has at least one hand-controlled input device other than the keyboard 442. In the illustrated example, the computer 436 has a touch pad 476 positioned on the keyboard 442. In other embodiments, the computer 436 has a mouse, a trackball and/or a stylus. The computer 436 also has plurality of standard input, input apparatuses, or control buttons 477 which enable the user to control certain settings of the computer 436 as well as the power of the computer 436.

The computer 436 also has a plurality of ports or connection devices 479 located on the front surface 452 of the housing 446 for convenient access. Here, a sliding door 481 is movable to cover and expose the connection devices 479. In one embodiment, a personal digital assistant (PDA) is connectable to one of these ports 479, and the computer 436 includes a PDA holder 738 (diagrammatically illustrated in FIGS. 23 and 24), a PDA arm or another type of PDA support member adapted to support one or more PDA's. In addition, the computer 436 includes a hard disk drive 483 and a drive 485 which functions as a CDROM (Compact Disk-Read-Only Memory) drive and a DVD (Digital Video Disk) drive.

Figure 25:
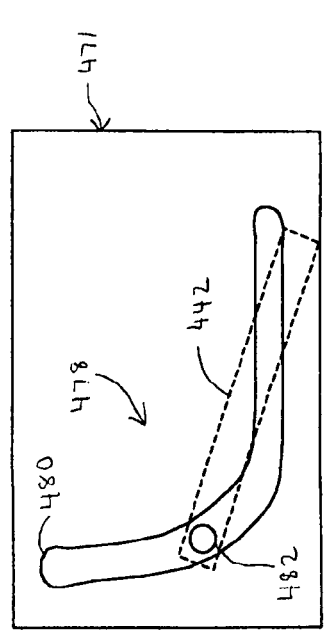
FIG. 25 is a side elevation view of a slot and groove device used to couple the keyboard to the computer housing in one embodiment of the present invention.

Referring to FIG. 25, in one embodiment, the housing 446 of the computer 436 includes a sliding coupling device 478 which slidably couples the keyboard 442 to the housing 446. The coupling device 478 includes an arc-shaped slot wall 480 positioned on each of the end walls 471 of the housing 446. Also, the coupling device 478 includes a protrusion member 482 connected to each end 467 of the keyboard 442. The protrusion member 482 is received by and mates with the slot wall 480. This enables the user to adjust the keyboard 442 by sliding the keyboard 442 along the arc-shaped slot wall 480.

Figure 26:
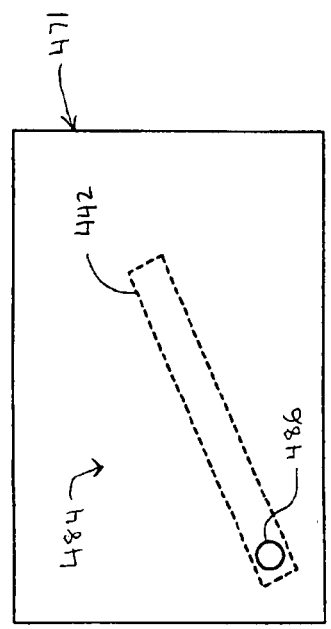
FIG. 26 is a side elevation view of a pivot or hinge device used to couple the keyboard to the computer housing in one embodiment of the present invention.
Figure 28:
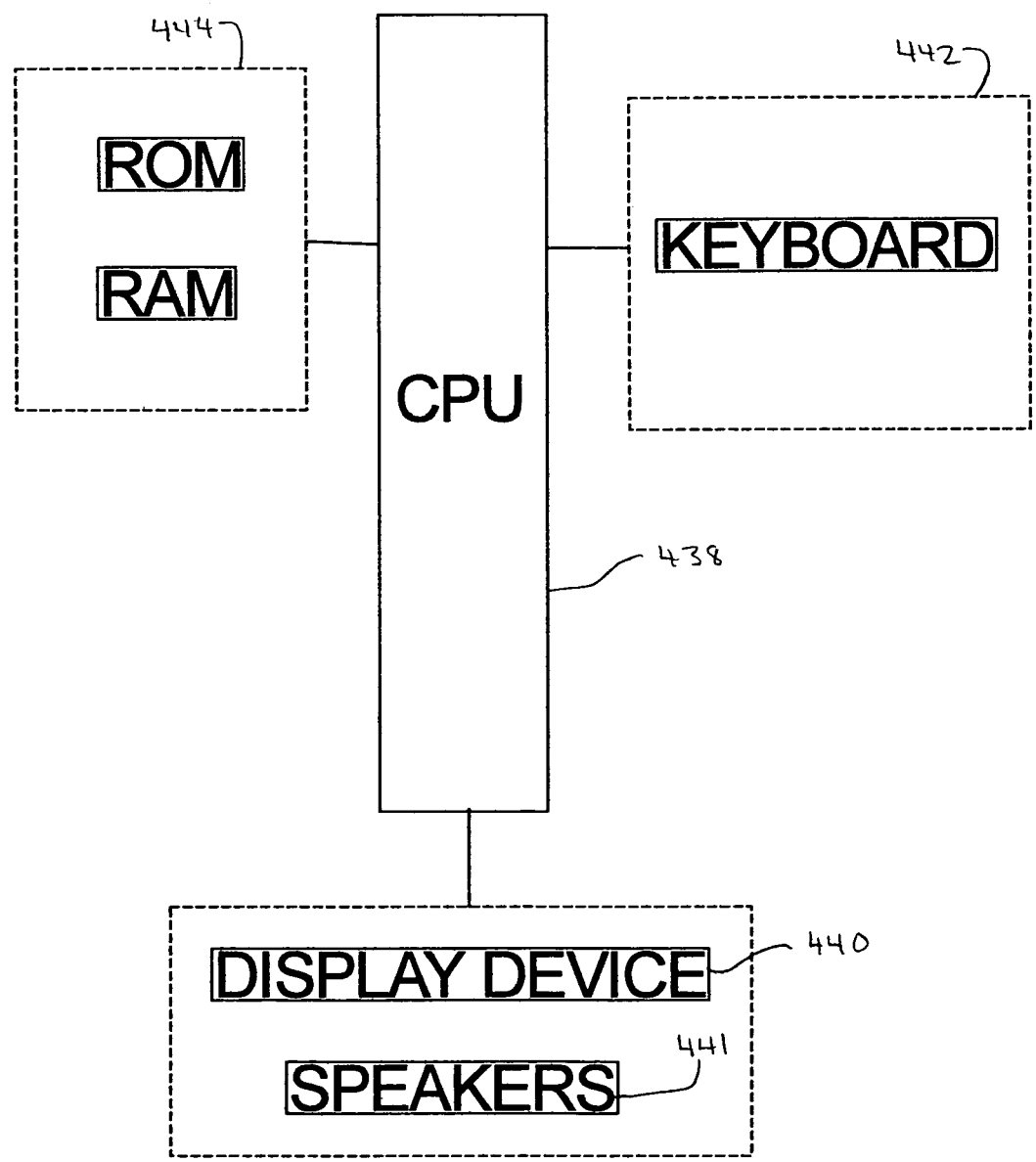
FIG. 28 is a schematic block diagram illustrating the electronic configuration of the computer in one embodiment of the present invention.

As illustrated in FIG. 26, in one embodiment, the housing 446 of the computer 436 includes a pivoting coupling device 484 which pivotally couples the keyboard 442 to the housing 446. The coupling device 484 includes a hinge, pin, or shaft 486 coupled to each of the wall ends 471 of the keyboard region 460. Each of the shafts 486 is engaged with one of the ends 467 of the keyboard 442. This enables users to pivot the keyboard 442 upward and downward.

In another embodiment illustrated in FIG. 27, the computer 436 has a housing 488 which includes a screen region 490 and a keyboard region 492 located below the screen region 490. The housing 488 has a plurality of walls 494 that define a cavity 496. The cavity 496 extends from the front through the backside of the computer 436. The cavity 496 is sufficiently sized and shaped so as to receive the user's hands while the user is operating the keyboard 497. In this embodiment, the keyboard 497 is non-movably or rigidly connected to the lower wall 498 of the housing 488. It should be appreciated, however, that in other embodiments, the keyboard 497 can be adapted to have a designated incline or an angle adjustment device.

Figure 29:
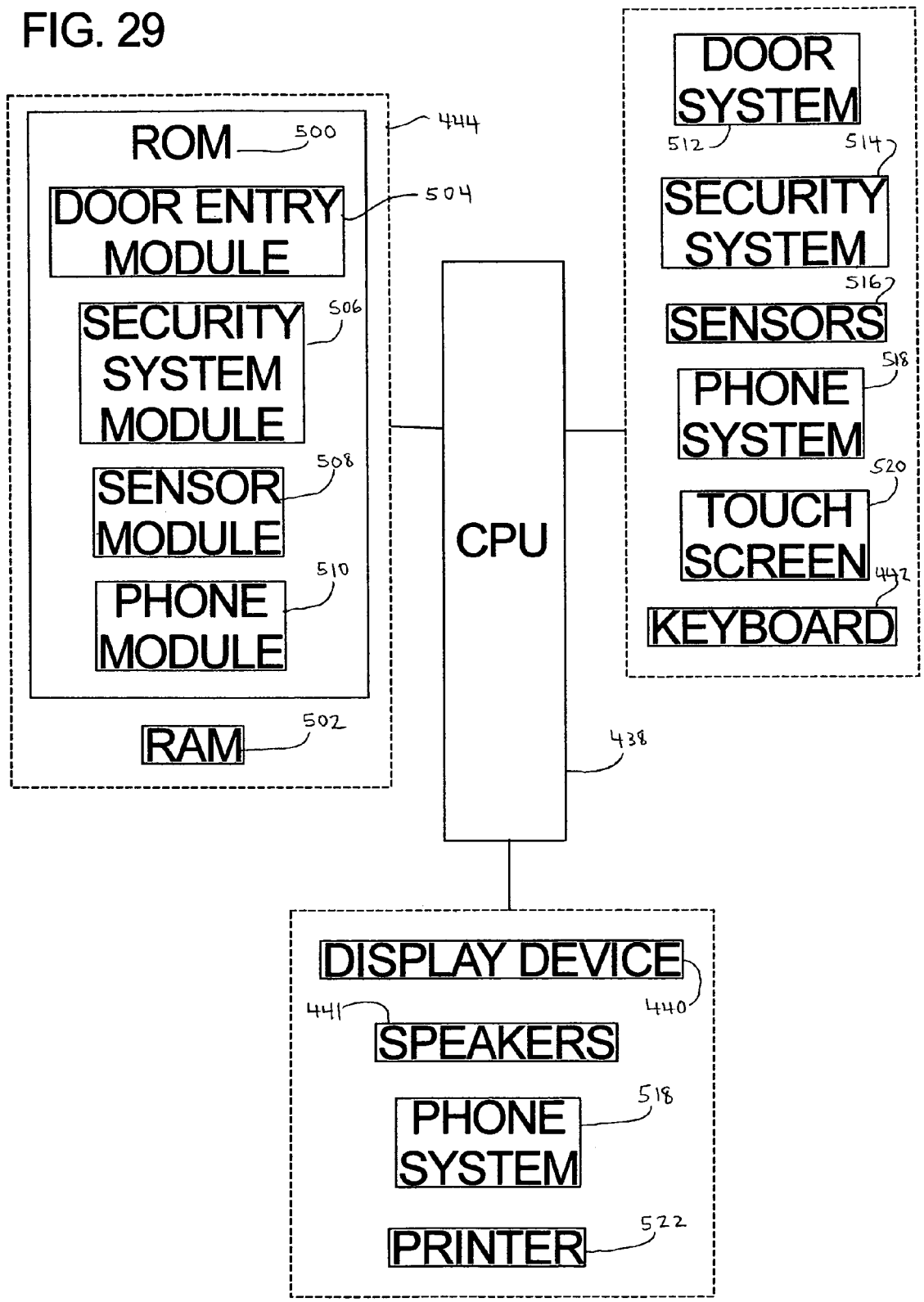
FIG. 29 is a schematic block diagram illustrating the electronic configuration of the computer in another embodiment of the present invention.

Referring to FIG. 29 in one embodiment, the memory device 444 of the computer 436 includes Read Only Memory (ROM) 500 and Random Access Memory (RAM) 502. The ROM 500 stores: (a) a door entry module 504 which has instructions and/or circuitry for operating a door control system of a house or other facility; (b) a security system module 506 which has instructions and/or circuitry for operating a security system for a house or other facility; (c) a sensor module 508 which has instructions and/or circuitry for managing communications with sensors in a house or other facility; and (d) a phone module 520 which has instructions and/or circuitry for operating a phone system in a house or other facility.

In operation, the processor 438 receive inputs from: (a) a door entry system or door system 512 for a house or other facility; (b) a security system 514 for a house or other facility; (c) a plurality of sensors 516 located in a house or other facility; (d) a phone system 518 for a house or other facility; (e) a touch screen 520 included within the display device 440; and (f) a keyboard 442. In addition to providing output to the display device 440 and the speakers 441, the processor 438 also provides output to the phone system 518 and a printer 522.

In one embodiment, the memory device 444 stores a plurality of instructions which direct the processor to control an Internet browser based on inputs from a user. When a designated event occurs, the instructions cause the processor 438 to automatically redirect the Internet browser to a website designated for a household or facility. In this embodiment, the user or facility manager may subscribe to the services of an Internet service provider. The Internet service provider may provide free or relatively low cost Internet access in exchange for receiving the right to designate the service provider's website as a default home website for the computer 436. This would thus enable the service provider to advertise products and services to the user using the default website.

In one embodiment, each of the computers 400 and 436 is programmed or configured so that the default website is not adjustable or changeable by the user. The computers may be programmed to return to the default website when any suitable event occurs, including, but not limited to, an expiration of a period of time during which the user has made no inputs, the computers being shut off, the computers being reset and the Internet browser being opened.

In one embodiment, the memory device 444 includes a plurality of instructions which direct the processor 438 to automatically retrieve a designated image from a website designated for a house or a facility when a designated event occurs. The instructions cause the display device 440 to display the retrieved designated image for a period of time until a designated event occurs. The designated image can include an advertisement image, a graphical representation of facility-related information or artwork.

In another embodiment, each of the computers 400 and 436 has an electronic configuration including a processor, a system controller, a cache, and a data-path chip, each coupled to a host bus. The processor is a microprocessor such as a 486-type chip, a Pentium.RTM., Pentiun-LRTM. II, Pentium-.RTM. imi, Pentium.RTM. 4, or other suitable microprocessor. The cache provides high-speed local-memory data (in one embodiment, for example, 512 kB of data) for the processor, and is controlled by the system controller, which loads the cache with data that is expected to be used soon after the data is placed in the cache (i.e., in the near future).

The main memory is coupled between the system controller and data-path chip, and in one embodiment, provides random-access memory of between 16 MB and 256 MB or more of data. In one embodiment, the main memory is provided on SIMMs (Single In-line Memory Modules), while in another embodiment, the main memory is provided on DIMMs (Dual In-line Memory Modules), each of which plugs into suitable sockets provided on a motherboard holding other components. The main memory includes standard DRAM (Dynamic Random-Access Memory), EDO (Extended Data Out) DRAM, SDRAM (Synchronous DRAM), or other suitable memory technology. The system controller controls PCI (Peripheral Component Interconnect) bus, a local bus that provides a high-speed data path between the processor and various peripheral devices, such as graphics devices, storage drives and network cabling.

A data-path chip is also controlled by the system controller to assist in routing data between the main memory, the host bus, and the PCI bus. In one embodiment, the PCI bus provides a 32-bit-wide data path that runs at 33 MHz. In another embodiment, the PCI bus provides a 64-bit-wide data path that runs at 33 MHz. In yet other embodiments, the PCI bus provides 32-bit-wide or 64-bit-wide data paths that run at higher speeds. In one embodiment, PCI bus provides connectivity to an I/O bridge, a graphics controller, and one or more PCI connectors (i.e., sockets into which a card edge may be inserted), each of which accepts a standard PCI card. In one embodiment, the I/O bridge and the graphics controller are each integrated on the motherboard along with the system controller, in order to avoid a board-connector-board signal-crossing interface and thus provide better speed and reliability.

In this embodiment, the graphics controller is coupled to a video memory (that includes memory such as DRAM, EDO DRAM, SDRAM, or VRAM (Video Random-Access Memory)), and drives a VGA (Video Graphics Adaptor) port. The VGA port can connect to industry-standard monitors such as a VGA-type, SVGA (Super VGA)-type, XGA-type (eXtended Graphics Adaptor) or SXGA-type (Super XGA) display devices.

Other input/output (110) cards having a PCI interface can be plugged into the PCI connectors. The network connections providing video input are also represented by the PCI connectors, and include Ethernet devices and cable modems for coupling to a high speed Ethernet network or cable network which is further coupled to the Internet.

In one embodiment, the I/O bridge is a chip that provides connection and control to one or more independent IDE or SCSI connectors, to a USB (Universal Serial Bus) port, and to an ISA (Industry Standard Architecture) bus. In this embodiment, the IDE connector provides connectivity for up to two standard IDE-type devices such as hard disk drives, CDROM (Compact Disk-Read-Only Memory) drives, DVD (Digital Video Disk) drives, videocassette recorders, or TBU (Tape-Backup Unit) devices. In one similar embodiment, two IDE connectors are provided, and each provide the EIDE (Enhanced IDE) architecture. In the embodiment shown, a SCSI (Small Computer System Interface) connector provides connectivity for up to seven or fifteen SCSI-type devices (depending on the version of SCSI supported by the embodiment).

In one embodiment, the I/O bridge provides an ISA bus having one or more ISA connectors (in one embodiment, three connectors are provided). In one embodiment, the ISA bus is coupled to the I/O controller, which in turn provides connections to two serial ports, a parallel port, and a FDD (Floppy-Disk Drive) connector. At least one serial port is coupled to a modem for connection to a telephone system providing Internet access through an Internet service provider. In one embodiment, the ISA bus is connected to a buffer, which is connected to an X bus, which provides connections to a real-time clock, a keyboard/mouse controller and a keyboard BIOS ROM (Basic Input/Output System Read-Only Memory) 345, and to a system BIOS ROM.

Each of the computers 400 and 436 performs several functions. Such functions are implemented in software in one embodiment, where the software comprises computer executable instructions stored on computer readable media such as disk drives coupled to connectors, and executed from the main memory and the cache. The term "computer readable medium" is also used to represent carrier waves on which the software is transmitted.

It should be appreciated that each of the computers 400 and 436 can have any size which is suitable for its application. In one embodiment, the screen of the computer is sized similar to that of a conventional personal computer. In another embodiment, the computer is miniaturized or relatively small so that the computer can be mounted within a dashboard of a vehicle.

The present invention, in one embodiment, includes a website controlled by the computer system 10. The website is accessible to property managers, service providers and facility users. The computer system 10 directs one or more servers to process sensor-generated data along with data manually input by property managers and users regarding the facility. The computer system 10 thus provides one central location for the management of service data derived by users as well as sensors. This type of computer system enhances the efficiency and convenience of owning, operating and managing facilities.

In another embodiment, the present invention includes a wall-mountable computer. The computer has a built-in keyboard which is positioned or positionable for operation while the computer is secured to an upstanding structure, such as a wall. The wall-mountable computer brings the functionality of the personal office computer to those involved in carrying out household activities on a regular basis. The integrated keyboard enables the computer to be relatively thin which, in turn, safeguards the computer and enhances the aesthetics of the computer. This type of computer provides a relatively high degree of convenience to computer users.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. An electronic device comprising:
  a housing configured to be mounted to a support, the housing having an upper end and a lower end, the housing defining a cavity;
  a central processing unit positioned within the housing a hard drive positioned within the housing;
  a display device mounted to the housing, the display device including:
    (a) a back portion supported by the housing, the back portion being positioned within the cavity of the housing; and
    (b) a front portion positioned opposite of the back portion, the front portion comprising a screen;
  a right wall supported by the housing and extending downward from the lower end of the housing, the right wall having a right side and a left side;
  a left wall supported by the housing and extending downward from the lower end of the housing, the left wall having a left side and a right side, the right side of the left wall being spaced apart from the left side of the right wall by a space, the space being located:
    (a) downward from the lower end of the housing; and
    (b) between the right and left walls;
  an input device having:
    (a) a right end spaced apart from a left end; and
    (b) a typing portion between the right and left ends of the input device,
  the input device being pivotable about an axis between a plurality of positions, the axis having a fixed position relative to the right and left walls, the plurality of positions including:
    (i) a first position in which the typing portion is positioned within the space; and
    (ii) a second position in which at least part of the typing portion is positioned outside of the space;
  a plurality of shaft portions positioned along the axis, the shaft portions including:
    (a) a right shaft portion which movably couples the right end of the input device to the left side of the right wall, the right shaft portion extending into the right wall; and
    (b) a left shaft portion which movably couples the left end of the input device to the right side of the left wall, the left shaft portion extending into the left wall.

2. The electronic device of claim 1, which includes a wall mount or wall securing member.

3. The electronic device of claim 1, wherein:
  (a) the right wall has a width selected from the group consisting of:
    (i) a uniform width; and
    (ii) a non-uniform width
  (b) the left wall has a width selected from the group consisting of:
    (i) a uniform width; and
    (ii) a non-uniform width.

4. The electronic device of claim 1, wherein the typing portion of the input device has:
  (a) a plurality of rows of keys; and
  (b) an input apparatus operable to steer a pointer displayable on the screen, the input apparatus positioned below at least one of the rows of keys.

5. The electronic device of claim 4, wherein the input apparatus includes an element selected from the group consisting of a touch pad, a mouse, a trackball, and a stylus.

6. The electronic device of claim 1, which includes at least one output device supported by the housing, at least part of the output device being positioned below the screen.

7. The electronic device of claim 6, wherein the output device is coupled to one of the right and left walls, the output device including a device selected from the group consisting of an audio output device and a speaker.

8. An electronic device comprising:
  a housing configured to be mounted to a support, the housing having an upper end and a lower end, the housing defining a cavity;
  a central processing unit positioned within the housing a hard drive positioned within the housing;
  a display device mounted to the housing, the display device including:
    (a) a back portion supported by the housing, the back portion being positioned within the cavity of the housing; and
    (b) a front portion positioned opposite of the back portion, the front portion comprising a screen;
  a right vertical wall supported by the housing and extending downward from the display device, the right vertical wall having:

(a) an outward side;
(b) an inward side; and
(c) at least one width portion between the outward side and the inward side;

a left vertical wall supported by the housing and extending downward from the display device, the left vertical wall having:
(a) an outward side;
(b) an inward side spaced apart from the inward side of the right vertical wall by a space located downward from the lower end of the housing; and
(c) at least one width portion between the outward side and the inward side of the left vertical wall;

an input device having:
(a) a right end;
(b) a left end; and
(c) a typing portion between the right and left ends, the input device being pivotable about an axis between a plurality of positions, the axis having a fixed position relative to the right and left vertical walls, the positions including:
(i) a first position in which the typing portion is positioned within the space and oriented inward; and
(ii) a second position in which at least part of the typing portion is positioned outside of the space and oriented at least partially outward;

a plurality of shaft portions which pivotably couple the input device to the right and left vertical walls, the shaft portions being positioned along the axis, the shaft portions including:
(a) a right shaft portion which pivotably couples the right end of the input device to the inward side of the right vertical wall, part of the right shaft portion extending into the width portion of the right vertical wall, said width portion being configured to provide support for the right shaft portion during use of the input device; and
(b) a left shaft portion which pivotably couples the left end of the input device to the inward side of the left vertical wall, part of the left shaft portion extending into the width portion of the left vertical wall, said width portion being configured to provide support for the left shaft portion during use of the input device.

9. The electronic device of claim 8, wherein:
(a) the right vertical wall has a width selected from the group consisting of:
(i) a uniform width; and
(ii) a non-uniform width, the right vertical wall having an additional width portion, the width portion of the right vertical wall and the additional width portion of the right vertical wall having different widths.
(b) the left vertical wall has a width selected from the group consisting of:
(i) a uniform width; and
(ii) a non-uniform width, the left vertical wall having an additional width portion, the width portion of the left vertical wall and the additional width portion of the left vertical wall having different widths.

10. The electronic device of claim 8, wherein the typing portion of the input device has:
(a) a plurality of rows of keys; and
(b) an additional input device operable to steer a pointer displayable on the screen, the additional input device positioned below at least one of the rows of keys.

11. The electronic device of claim 10, wherein the additional input device includes an element selected from the group consisting of a touch pad, a mouse, a trackball, and a stylus.

12. The electronic device of claim 8, which includes at least one output device supported by the housing, at least part of the output device being positioned below the screen.

13. The electronic device of claim 12, wherein the output device is coupled to one of the right and left vertical walls, the output device being selected from the group consisting of an audio output device and a speaker.

14. The electronic device of claim 8, which includes at least one input apparatus supported by the housing, at least part of the input apparatus being positioned below the screen, the input apparatus having a device selected from the group consisting of an input member and a control button.

15. The electronic device of claim 8, wherein the housing, the right vertical wall, and the left vertical wall are elements of an integral structure.

16. The electronic device of claim 8, which includes a wall mount or a wall securing member.

17. An electronic device comprising:
a housing configured to be mounted to a support, the housing having an upper end and a lower end, the housing defining a cavity;
a central processing unit positioned within the housing a hard drive positioned within the housing;
a display device mounted to the housing, the display device including:
(a) a back portion supported by the housing, the back portion being positioned within the cavity of the housing; and
(b) a front portion positioned opposite of the back portion, the front portion comprising a screen;
a right leg coupled to the housing and extending downward from the display device;
a left leg coupled to the housing and extending downward from the display device, the left leg being spaced apart from the right leg,
the right and left legs defining a space located:
(a) downward from the lower end of the housing; and
(b) between the right and left legs;
an input device pivotably coupled to the right and left legs, the input device being movable relative to the right and left legs, the input device having:
(a) a right end;
(b) a left end; and
(c) a typing portion between the right and left ends, the typing portion having a plurality of rows of keys,
the input device being pivotable about an axis between a plurality of positions, the axis having a fixed position relative to the right and left legs, the positions including:
(i) a first position in which the typing portion is positioned within the space; and
(ii) a second position in which at least part of the typing portion is positioned outside of the space.

18. The electronic device of claim 17, wherein the input device includes a pointer device, the pointer device including an element selected from the group consisting of a touch pad, a mouse, a trackball, and a stylus.

19. The electronic device of claim 17, which includes a holder coupled to the housing, the holder being configured to hold a device selected from the group consisting of a handheld electronic device and a personal digital assistant.

20. The electronic device of claim 17, wherein the screen has a touch screen.

21. The electronic device of claim 20, which includes a wall mount or a wall securing member.

22. The electronic device of claim 17, which includes a wall mount or a wall securing member.

23. The electronic device of claim 17, wherein the housing, the right leg, and the left leg are elements of an integral structure.

24. An electronic device comprising:
a computer housing configured to be mounted to an upstanding structure, the computer housing having:
   (a) an upper housing section, the upper housing section defining a cavity;
   (b) a right leg section extending downward from the upper housing section;
   (c) a left leg section extending downward from the upper housing section, the left leg section being spaced apart from the right left leg section by a space; and
   (d) a plurality of side sections;
a central processing unit positioned within the cavity of the upper housing section; a hard drive positioned within the cavity of the upper housing
at least one memory device positioned within the cavity of the upper housing section, the memory device being usable by the central processing unit to perform a plurality of computer functions;
at least one data port connected to at least one of the side sections of the computer housing, the data port being operatively coupled to the central processing unit;
a display device mounted to the computer housing, a portion of the display device being positioned within the cavity of the upper housing section, the display device comprising a screen;
a plurality of shafts extending along an axis, the axis being fixed relative to the computer housing, the shafts comprising:
   (a) a right shaft, part of the right shaft extending into the right leg section; and
   (b) a left shaft, part of the left shaft extending into the left leg section; and
a keyboard having: (a) a right end coupled to the right shaft; (b) a left end coupled to the left shaft; (c) a plurality of keys, the keyboard being pivotable between a plurality of positions relative to the computer housing, the keyboard being located below the screen in each of the positions, the positions comprising:
   (i) a closed position in which the keys are positioned within the space; and
   (ii) an open position in which the keys are positioned outside of the space.

25. The electronic device of claim 24, wherein the keyboard has a pointing device located between the right and left ends of the keyboard, the pointing device including an element selected from the group consisting of a touch pad, a mouse, a trackball, and a stylus.

26. The electronic device of claim 24, which includes a wall mount or a wall securing member.

27. The electronic device of claim 24, which includes at least one audio output device supported by the computer housing, at least part of the audio output device being positioned below the screen.

* * * * *